(12) United States Patent
Sakurai

(10) Patent No.: US 7,953,918 B2
(45) Date of Patent: May 31, 2011

(54) SERVICE BUS LINKING METHOD AND SERVICE BUS FOR LINKING PLURALITY OF SERVICE BUSES TOGETHER

(75) Inventor: Kenichi Sakurai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 12/417,001

(22) Filed: Apr. 2, 2009

(65) Prior Publication Data

US 2009/0327557 A1    Dec. 31, 2009

(30) Foreign Application Priority Data

Jun. 25, 2008    (JP) ................. 2008-166154

(51) Int. Cl.
*G06F 13/00*    (2006.01)

(52) U.S. Cl. ...................................... 710/300; 710/305

(58) Field of Classification Search .......... 710/305–317, 710/8–12, 2, 104–110; 709/201–203, 242, 709/231, 249–250; 705/1.1, 8–10
See application file for complete search history.

(56) References Cited

U.S. PATENT DOCUMENTS

| | | | |
|---|---|---|---|
| 6,647,446 B1* | 11/2003 | James et al. .................. 710/100 |
| 6,658,517 B1* | 12/2003 | Niimi et al. .................. 710/305 |
| 2004/0032625 A1* | 2/2004 | Yamano ........................ 358/405 |
| 2006/0002314 A1* | 1/2006 | Fukunaga et al. ............ 370/257 |
| 2008/0069082 A1* | 3/2008 | Patrick ........................ 370/351 |
| 2008/0183479 A1* | 7/2008 | Iwashita et al. .................. 705/1 |
| 2009/0144724 A1* | 6/2009 | Little ............................ 717/173 |
| 2009/0327406 A1* | 12/2009 | Miwa et al. .................. 709/203 |

FOREIGN PATENT DOCUMENTS

JP    2003-274068    9/2003

* cited by examiner

*Primary Examiner* — Raymond N Phan

(74) *Attorney, Agent, or Firm* — Katten Muchin Rosenman LLP

(57) ABSTRACT

A service bus linking method for linking a plurality of service buses together includes inputting to a service bus to be added a node identifier and a position of an existing service bus to be connected, and registering a node identifier and a position of the existing service bus in a bus node table to store identifiers and positions of the service bus to be added and an adjacent service bus; second a bus node table updating notification from the service bus to be added to the existing service bus; and registering a node identifier and a position of the service bus to be added in a bus node table of the existing table, in response to the bus node table updating notification.

19 Claims, 23 Drawing Sheets

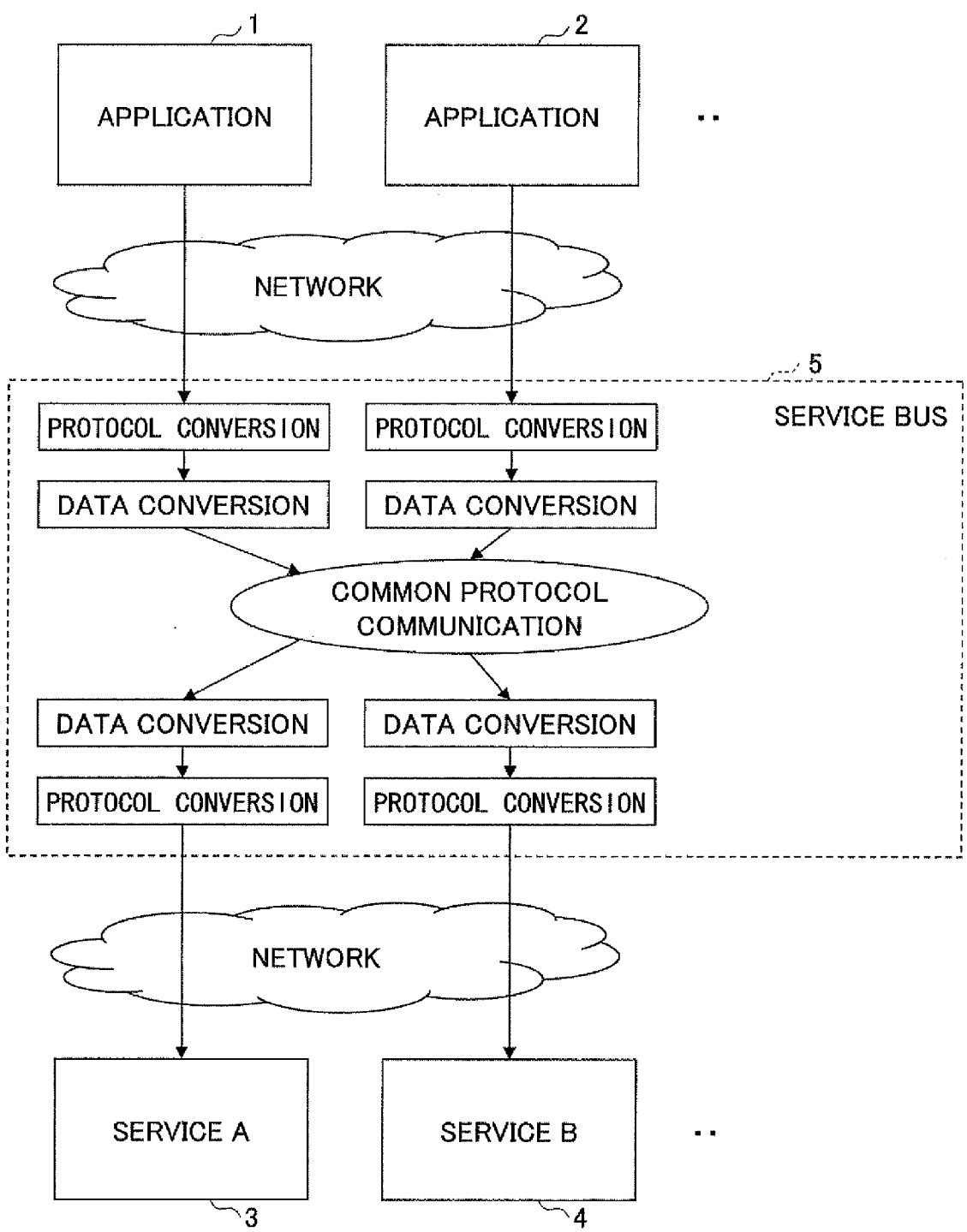

FIG.2A DESTINATION DESIGNATED STARTING-UP TYPE
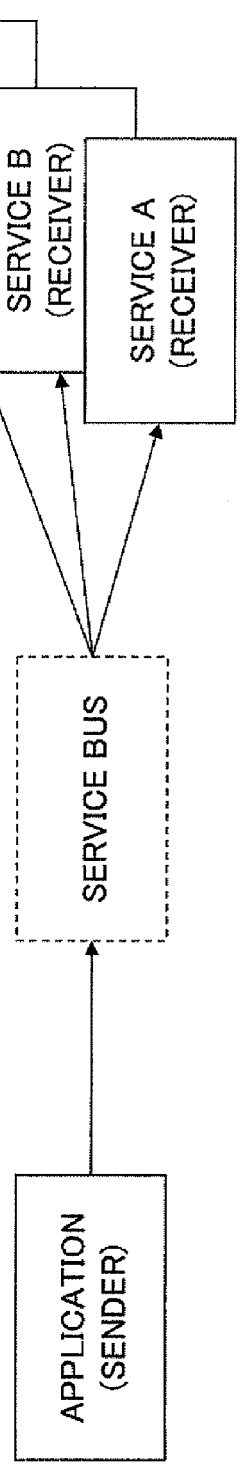
FIG.2B BROADCAST STARTING-UP TYPE
FIG.2C READING TYPE

FIG.8A

SERVICE ROUTE TABLE INPUT
FROM SERVICE BUS NODE #2

| SERVICE ID | NUMBER OF HOPS |
|---|---|
| A | 2 |
| B | 1 |
| C | 1 |
| D | 1 |
| E | 3 |
| F | 3 |

FIG.8B

NUMBER OF HOPS + 1 IN SERVICE ROUTE
TABLE INPUT FROM SERVICE BUS NODE #2

| SERVICE ID | NUMBER OF HOPS |
|---|---|
| A | 3 |
| B | 2 |
| C | 2 |
| D | 2 |
| E | 4 |
| F | 4 |

FIG.8C

EXISTING SERVICE ROUTE TABLE
OF SERVICE BUS NODE #1

| NODE ID | SERVICE ID | NUMBER OF HOPS |
|---------|------------|----------------|
| #1      | A          | 0              |
| #2      | B          | 2              |
| #3      | C          | 1              |
| #3      | D          | 1              |
| #4      | D          | 3              |
| #3      | E          | 1              |
| #3      | F          | 1              |
| #4      | F          | 2              |

FIG.8D

UPDATED SERVICE ROUTE TABLE
OF SERVICE BUS NODE #1

| NODE ID | SERVICE ID | NUMBER OF HOPS |         |
|---------|------------|----------------|---------|
| #1      | A          | 0              |         |
| #2      | B          | 2              |         |
| #3      | C          | 1              |         |
| #2      | C          | 2              | ADDED   |
| #3      | D          | 1              |         |
| #2      | D          | 2              | UPDATED |
| #3      | E          | 1              |         |
| #2      | E          | 4              | ADDED   |
| #3      | F          | 1              |         |
| #4      | F          | 2              |         |

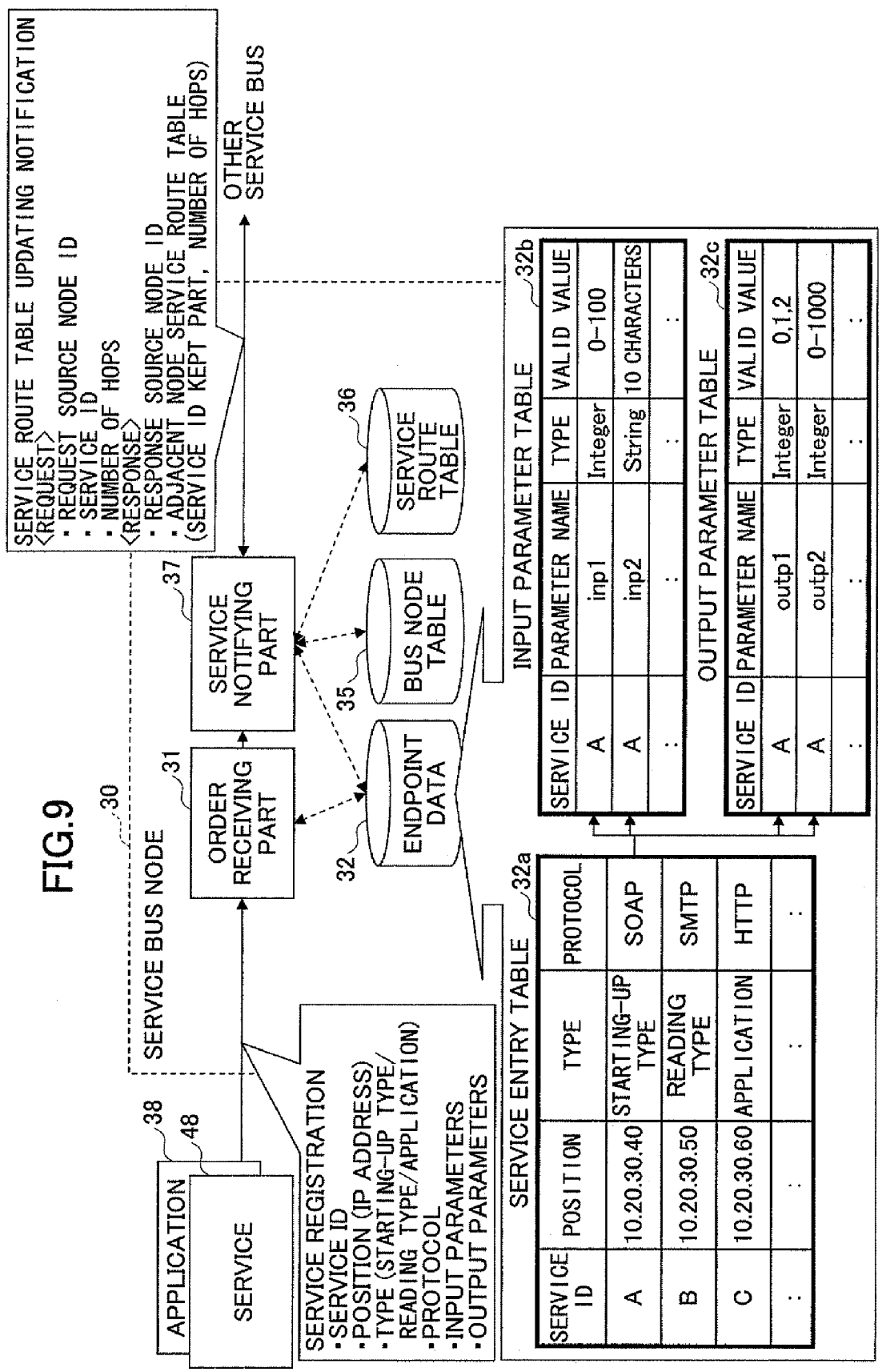

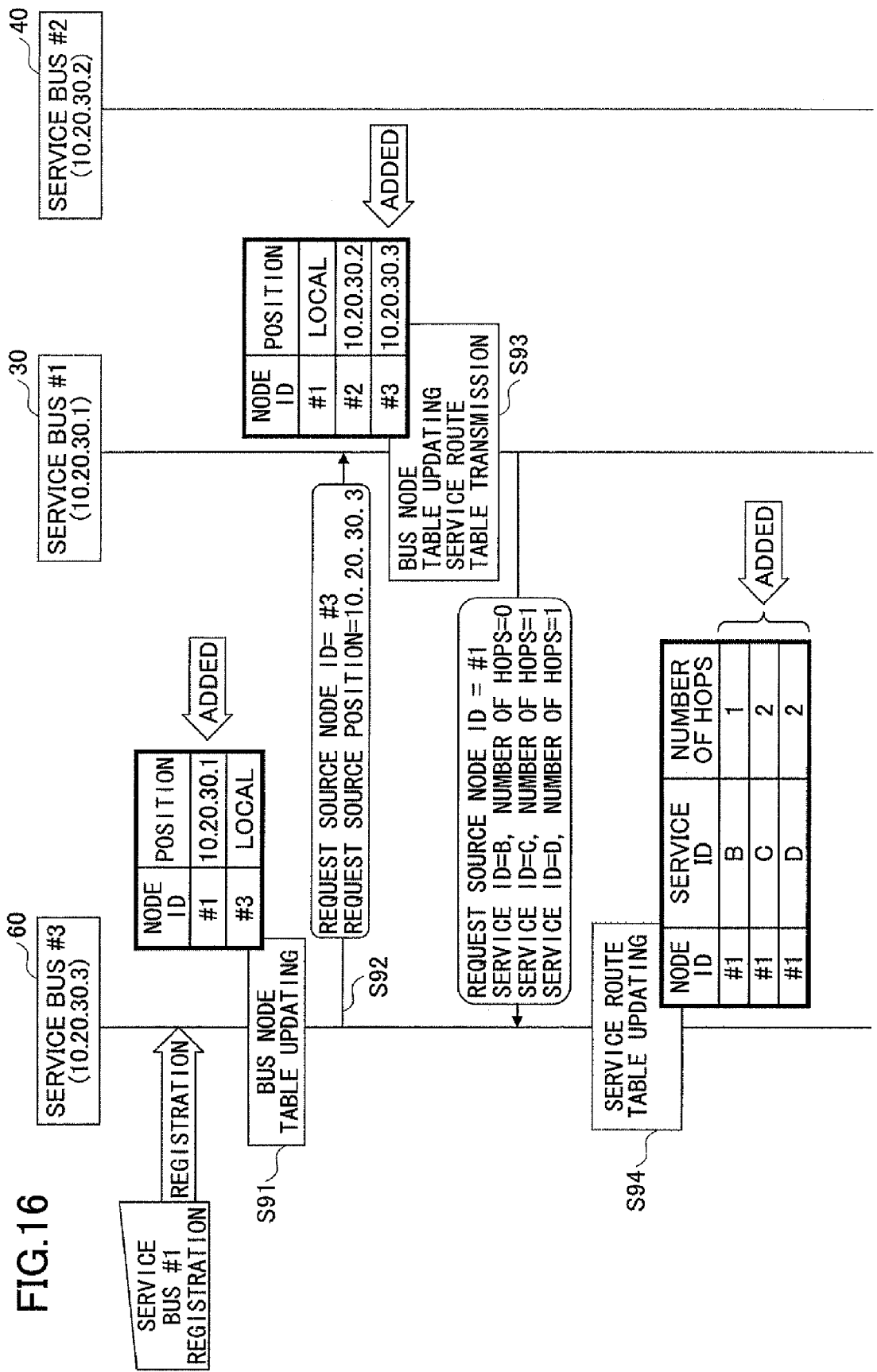

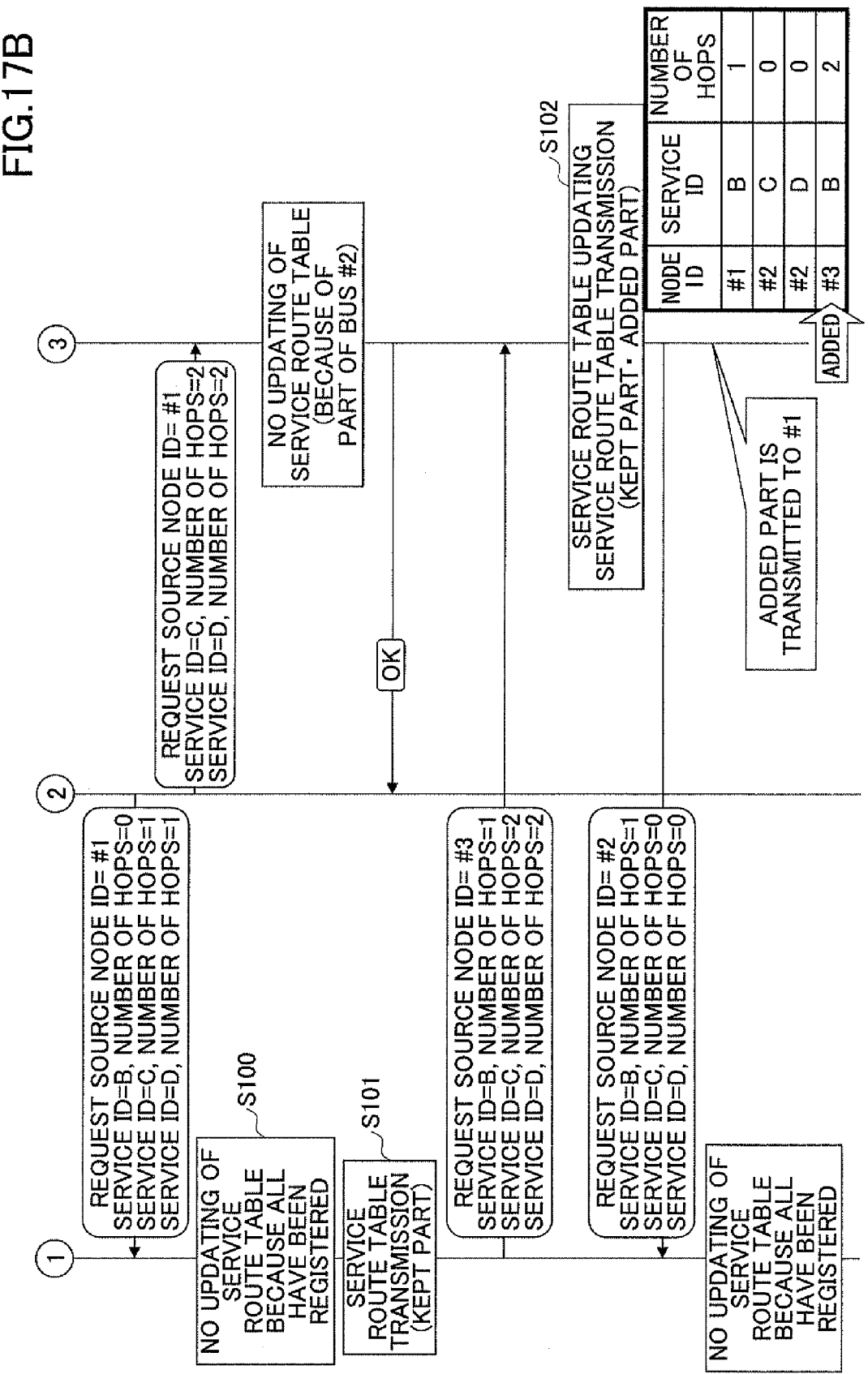

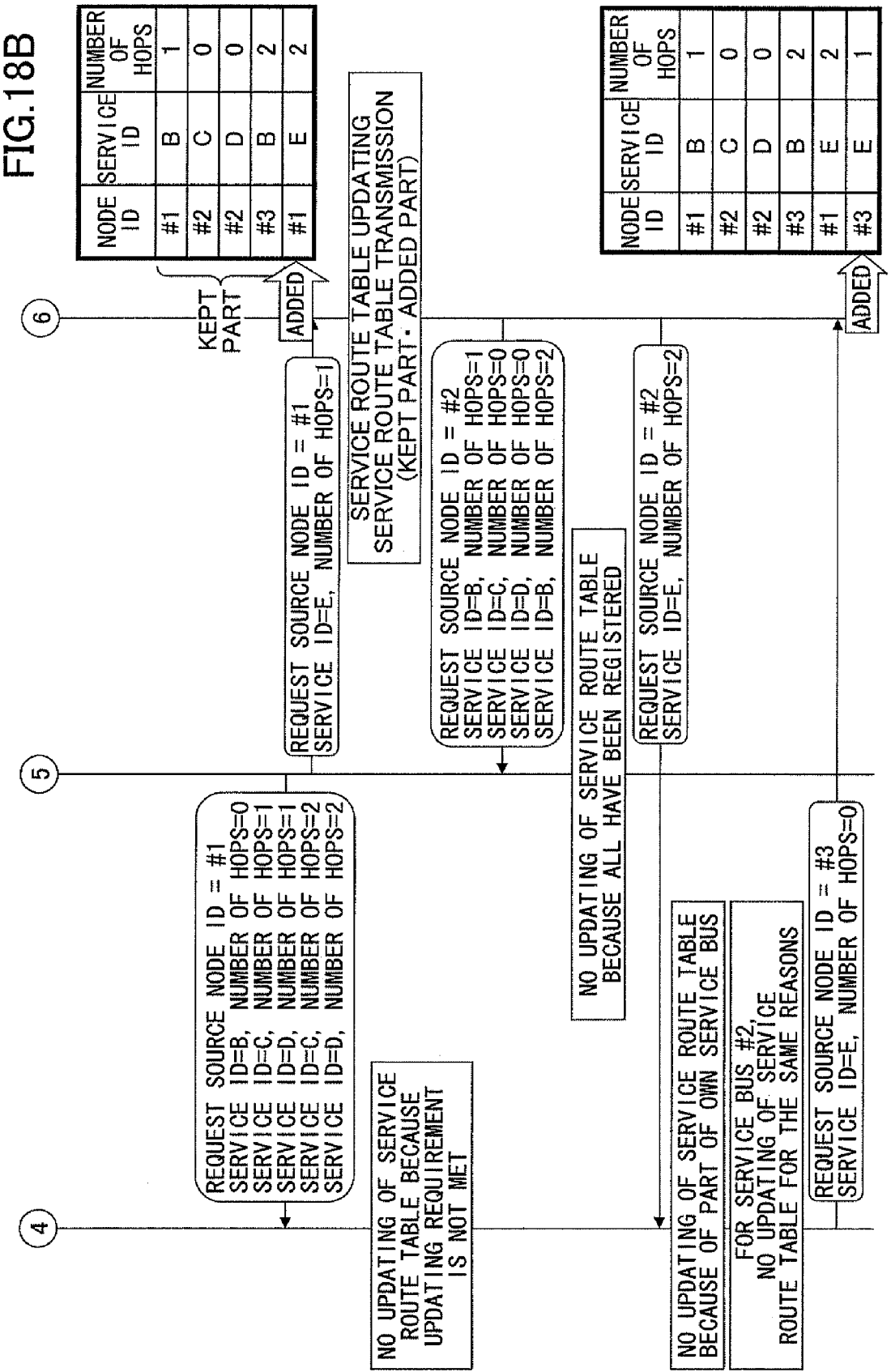

SERVICE BUS LINKING METHOD AND SERVICE BUS FOR LINKING PLURALITY OF SERVICE BUSES TOGETHER

CROSS-REFERENCE TO RELATED APPLICATIONS

This application is based upon and claims the benefit of priority of the prior Japanese Patent Application No. 2008-166154, filed on Jun. 25, 2008, the entire contents of which are incorporated herein by reference.

FIELD

The embodiment discussed herein is related to a method for linking service buses and a service bus.

BACKGROUND

The following prior art is known. In the prior art, an instruction processing part receives a user's service request from an instruction part, and sends the service request to a corresponding copy service processing part, print service processing part, or facsimile service processing part via a service bus. The copy service processing part, print service processing part, or facsimile service processing part having received the service request controls a corresponding input control part, output control part, network communication control part, or facsimile communication control part, and provides a service with the use of one or more devices of an image input part, an image output part, a network communication part and a facsimile transmission/reception part.

[Patent Document 1]
Japanese Laid-Open Patent Publication No. 2003-274068.

SUMMARY

According to an aspect of the invention, a service bus linking method for linking a plurality of service buses together, includes inputting, to a service bus to be added, a node identifier and a position of an existing service bus to be connected, and registering the node identifier and the position of the existing service bus in a bus node table of the service bus to be added to store identifiers and positions of the service bus to be added and an adjacent service bus; sending a bus node table updating notification, from the service bus to be added to the existing service bus; and registering, in a bus node table of the existing table, a node identifier and a position of the service bus to be added, in response to the bus node table updating notification.

The object and advantages of the invention will be realized and attained by means of the elements and combinations particularly pointed out in the claims.

It is to be understood that both the foregoing general description and the following detailed description are exemplary and explanatory only and are not restrictive of the invention, as claimed.

BRIEF DESCRIPTION OF DRAWINGS

FIG. 1 depicts a concept of a service bus;
FIGS. 2A, 2B and 2C illustrate modes of service accessing;
FIGS. 8A, 8B, 8C and 8D depict states of a service route table;
FIG. 9 depicts an outline of service registration operation;
FIGS. 16, 17A and 17B depict a sequence for newly adding a node;
FIGS. 18A and 18B depict a sequence for service registration.

Figure 3:
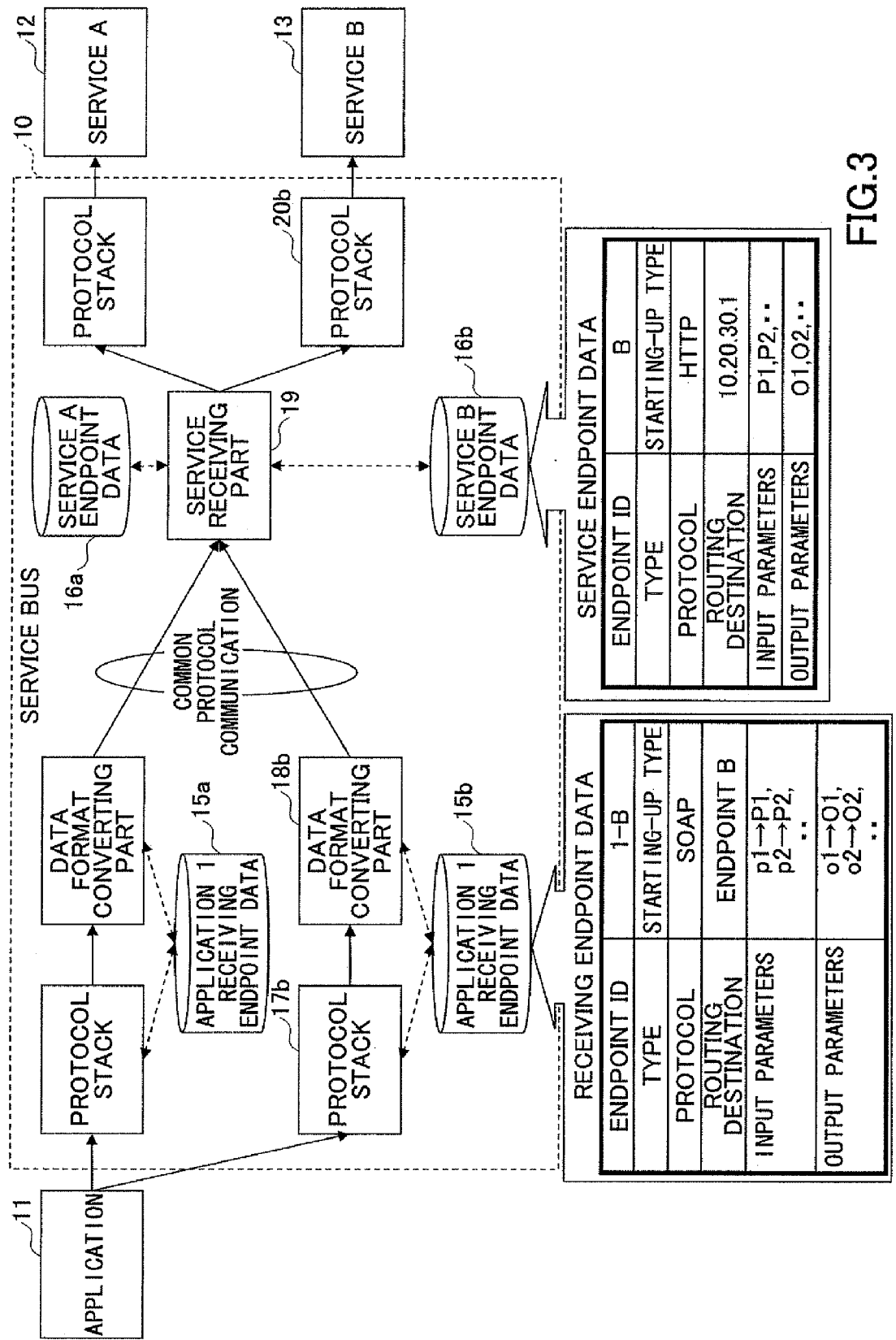
FIG. 3 depicts a configuration of a service bus in one reference example.

DESCRIPTION OF REFERENCE NUMERALS 30, 40 service bus (or node)
31, 41 order receiving part
32, 42 endpoint data
33, 43 protocol stack
34, 44 service bus registering part
35, 45 bus node table
36, 46 service route table
37, 47 service notifying part
38 application
39, 49 maintenance terminal
48 service

DESCRIPTION OF EMBODIMENT

When a certain business system is built, all business logics may be mounted in a single server. However, in such a method, it may not be possible to effectively utilize software, and it may be difficult to build another system with the use of software resources of the certain business system.

In order to effectively utilize software resources, there is a concept of SOA (Service-Oriented Architecture). SOA is a system architecture such that, software components and functions built and organized for business process units (which are referred to as services) are opened to a communication network. These services may be mutually linked, and thereby, a flexible enterprise system, an inter-enterprise process carrying-out system or such may be built.

Further, as a foundation to efficiently link the software components opened to SOA, there is a concept of a service bus, typified by ESB (Enterprise Service Bus). In the concept of SOA, in order to access software resources regarded as services, an application as an access source such as an enterprise system should know a protocol, a position such as an IP address and so forth of an access destination. A service bus is used for this purpose.

FIG. 1 depicts a concept of a service bus. In FIG. 1, when services 3 and 4 are accessed by applications 1 and 2, the applications 1 and 2 should only access a service bus 5 with a desired protocol and data format. Thus, the applications 1 and 2 should not know protocols and positions of the services 3 and 4. Therefore, it is possible to efficiently develop the applications 1 and 2.

The service bus 5 carries out common protocol communication with a protocol converting function and a data converting function to realize the functions.

Further, the service bus may support, depending on a service accessing mode, a function to provide an opportunity to a service to operate as depicted in FIG. 2A (destination designated starting-up type), a function to provide an opportunity to a plurality of services to operate simultaneously as depicted in FIG. 2B (a broadcast type), and a function to provide an opportunity to receive a processing result from a service (reading type). Therefore, the service bus may be used as a base to seek easiness of creating applications.

FIG. 3 depicts a configuration of a service bus in one reference example. It is necessary to set application receiving endpoint data 15a and 15b in the service bus 10 to connect an application 11 to services 12 and 13.

An application receiving endpoint means a connecting point for connecting an application to a specific service, and is set for each application. In the application receiving endpoint data 15a and 15b, a protocol which the application uses, a service (routing destination) to access, a type of the service (a starting-up type, a reading type or such), data for converting input/output parameters of the application 11 to input/output parameters for accessing the service, and so forth, are stored.

On one hand, as setting up data for accessing the services 12 and 13 from the service bus 10, service endpoint data 16a and 16b is also set. A service endpoint means a connecting point for connecting the services 12 and 13 from the service bus 10, and is set for each service. In service endpoint data, a protocol which a service uses, a type and input/output parameters of the service are stored.

When the application 11 accesses the service 13, the application 11 designates endpoint data 15b to be received by a service B for the application 11. A protocol stack 17b designated by application receiving endpoint data is prepared. When an order is received by the protocol stack 17b, a data format converting part 18b reads data for converting input parameters from the application receiving endpoint data, and converts the input parameters. Then, the data format converting part 18b reads a routing destination (in this case, the service 13) and sends a request to a service receiving part 19.

The service receiving part 19 reads the service endpoint data 16b, determines a destination (an IP address or such) of the service 13, transmits the input parameters to a designated protocol stack 20b, and thus, sends an order to the service 13.

It is noted that a configuration of connecting a plurality of service software with the use of a service bus is known (see Patent Document 1).

The service bus in the reference example depicted in FIG. 3 operates in a single physical server. However, in a case where the number of applications or the number of services connected to the service bus increase, access control or such may be required when the number of access requests exceeds a processing capability of the server. Thus, serviceability may degrade.

For such a case, a plurality of service buses may be prepared, and applications and services may be registered therewith in a distributed manner. However, in the service bus in the reference example depicted in FIG. 3, such a configuration is not provided that registration of applications and services in the distributed manner may be carried out. Further, when common protocol communication is carried out between the service buses, a maintenance load may increase and may become complicate as a result of an increase of required endpoint setting data.

In an embodiment, a distributed arrangement service buses is provided.

Below, the embodiment will now be described with reference to figures.

<Configuration of Service Bus>

Figure 4:
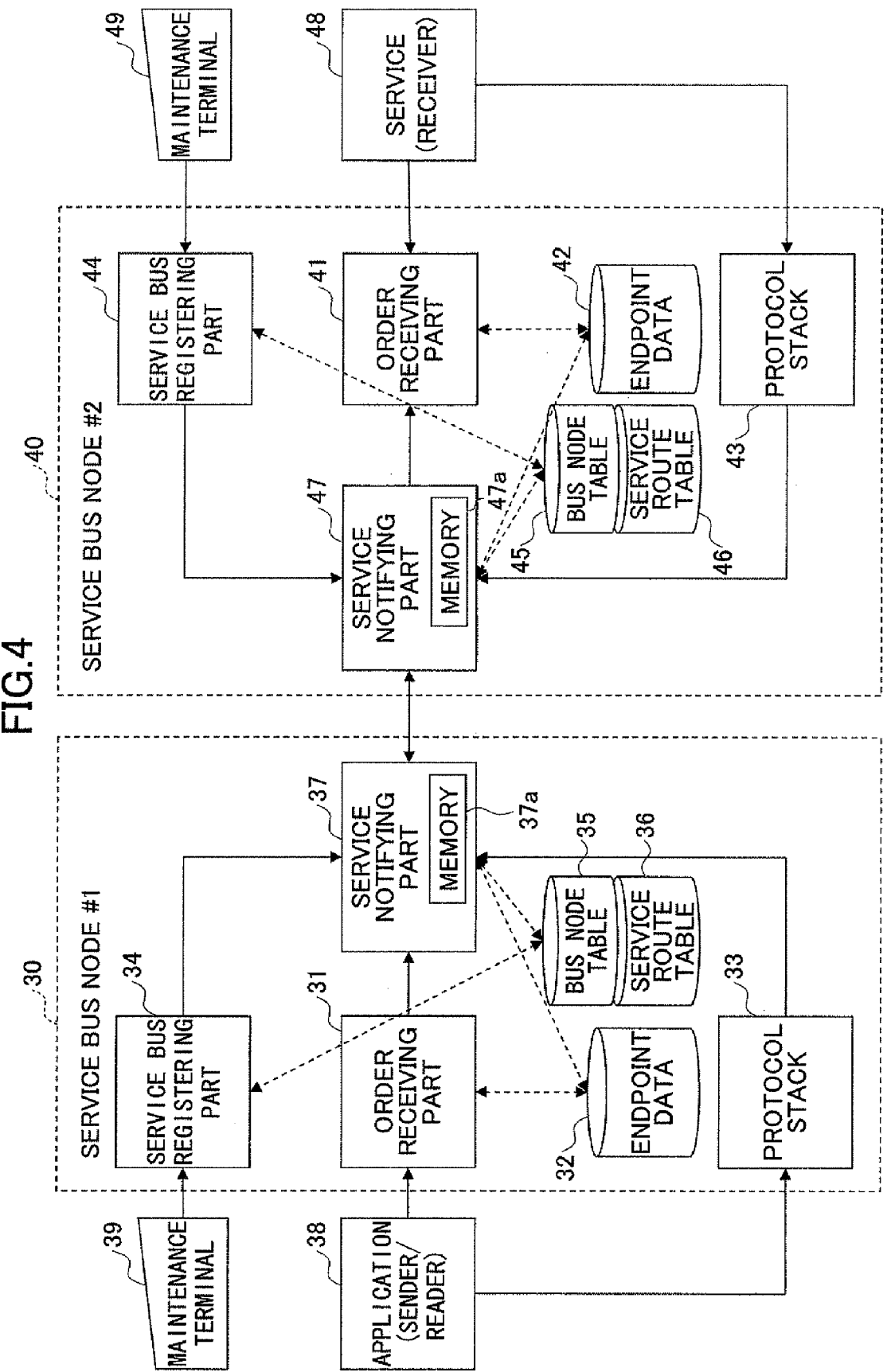
FIG. 4 depicts a service bus system in one embodiment.

FIG. 4 depicts a configuration of a service bus system in the embodiment. A physical server in which a service bus operates will be referred to as a node. In FIG. 4, a service bus (or a node) 30 includes an order receiving part 31, an endpoint data 32, a protocol stack 33, a service bus registering part 34, a bus node table 35, a service route table 36, and a service notifying part 37. The service notifying part 37 has a memory 37a. An application 38 is connected to the order receiving part 31 and protocol stack 33. A maintenance terminal 39 is connected to the service bus registering part 34.

Similarly, a service bus (or a node) 40 includes an order receiving part 41, an endpoint data 42, a protocol stack 43, a service bus registering part 44, a bus node table 45, a service route table 46, and a service notifying part 47. The service notifying part 47 has a memory 47a. A service 48 is connected to the order receiving part 41 and protocol stack 43. A maintenance terminal 49 is connected to the service bus registering part 44.

A maintenance person merely registers an adjacent service bus 40 to the service bus 30 which has been newly set up. An "adjacent service bus" means "a service bus which is connected adjacently".

A configuration is made such that, when the maintenance terminal 39 is used to carry out adjacent node registration (service bus registration), necessary information is transmitted to the adjacent service bus 40 via the service bus notifying part 37. Further, registration of the endpoint data 32 and 42 carried out by a maintenance person in the above-mentioned reference example is not carried out by the maintenance person, but is carried out by the application 38 or the service 48 (service registration). It is noted that, the term "service" will be broadly interpreted as including an application. Thereby, it is possible to simplify a maintenance procedure for service bus setting up.

Further, the service notifying parts 37 and 47 are provided, the bus node table 35 and the service route table 36 are read and updated, and communication between the service buses 30 and 40 is carried out. The service notifying parts 37 and 47 grasp what topology is used for the respective service buses 30 and 40 being connected, which service is registered in each node, and so forth, and exchange data, which is used as a base to carry out routing when an application accesses a service of another node.

Further, the service notifying parts 37 and 47 transmit and receive orders when a service of another node is to be accessed (service accessing) actually. Thereby, a plurality of service buses are linked together.

<Service Bus Registration>

Figure 5:
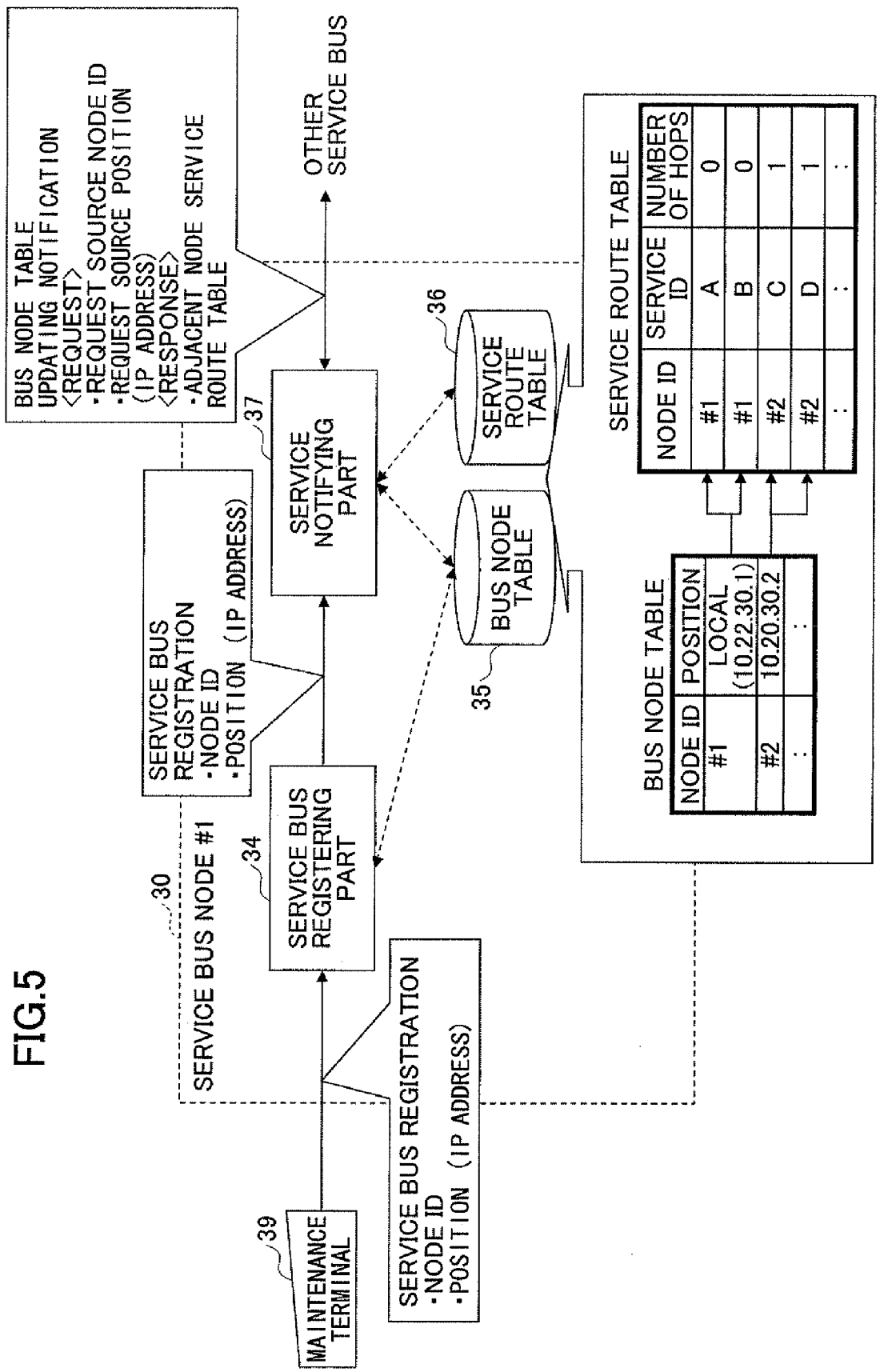
FIG. 5 depicts an outline of operation of service bus registration.

FIG. 5 depicts an outline of operation of service bus registration. When a node ID and a position (IP address) of the service bus 40 which is adjacent to the service bus 30 are input from the maintenance terminal 39 to the service bus 30, the service bus registering part 34 receives the order, reads the bus node table 35 and determines whether the service bus 40 has been already registered. When determining that the service bus 40 has not been registered yet, the service bus registering part 34 sends, to the service notifying part 37, an information notifying request for the adjacent service bus 40.

As a result, the service notifying part 37 updates the bus node table 35, and simultaneously, outputs a bus node table updating notification to the adjacent service bus 40 to notify that the service bus 30 has been added. The service notifying part 37 transmits, together with the bus node table updating notification, a request source node ID (in this case, "#1") and an IP address which is a request source position to the adjacent service bus 40. As a response to the transmission, the service notifying part 37 receives, from the adjacent service bus 40, a service route table 46 which the adjacent service bus 40 has, and updates the service route table 36 of the own service bus 30.

The bus node table 35 stores node IDs and positions of the adjacent service bus 40 and the own service bus 30. The service route table 36 manages which node is to be accessed and how many hops (the number of intermediate nodes) are required to reach a service.

FIG. 5 depicts that it is seen from the bus node table 35 that, node ID=#1 corresponds to the own node, and node ID=#2 corresponds to a node having an IP address of (10. 20. 30. 2). From the service route table 36, it is seen that, service ID=A is connected to the own node (node ID=#1), and accordingly, is located at such a position as to be reached by the number of hops of 0. It is seen that, service ID=C is located at such a position that it can be reached by the number of hops of 1 when node ID=#2 is accessed.

Figure 6:
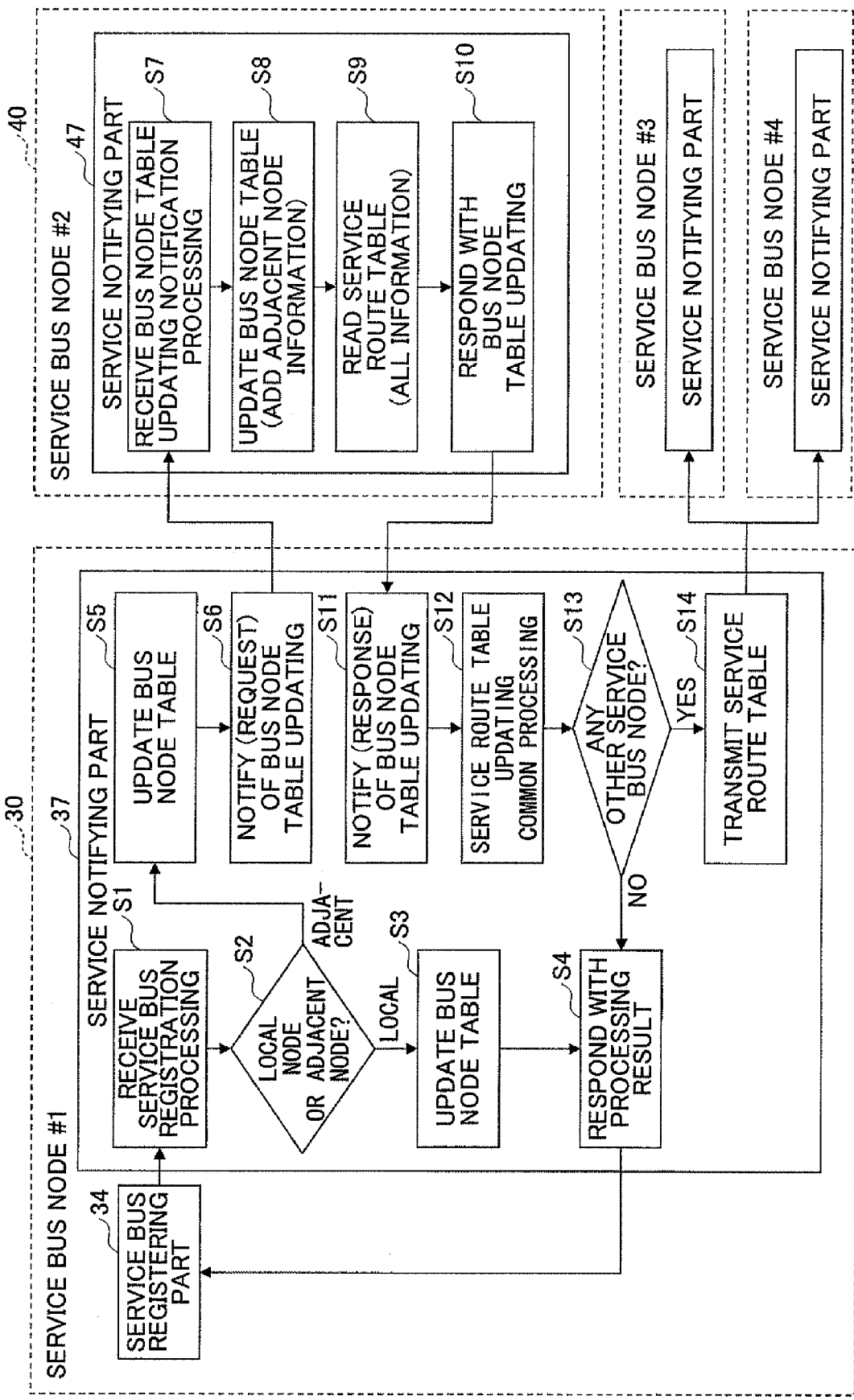
FIG. 6 depicts a flow chart of service bus registration processing.

FIG. 6 depicts a flow chart of service bus registering processing. When a maintenance person carries out registration of the service bus 30, service bus registration processing is received in step S1 by the service notifying part 37 via the service bus registering part 34.

First, it is determined whether the registration is for the own node (local) or an adjacent node (another node connected to the own node) in step S2. When the registration is for the own node (LOCAL in step S2), only the bus node table 35 is updated in step S3, and a response is returned to the service bus registering part 34 in step S4.

When the registration is for the adjacent service bus 40 (ADJACENT in step S2), the bus node table 35 is updated in step S5 (same as in the case of the registration for the own node). After that, a bus node table updating notification (as a request) is sent to the registered adjacent service bus 40 in step S6. In this notification (as a request), request source node ID=#1 and the IP address (10. 20. 30. 1) which is the request source position are set.

The adjacent service bus 40 receives the request in the service notifying part 47 in step S7, and updates the bus node table 45 in step S8. That is, the request source node ID=#1 and the IP address (10. 20. 30. 1) which is the request source position are written in the bus node table 45. Then, the service route table 46 of the service bus 40 is read in step S9, and is transmitted to the service bus 30 as a response, in step S10.

When receiving the service route table 46 of the service bus 40 in step S11, the service bus 30 updates the service route table 36 of the own service bus 30 in step S12.

Figure 7:
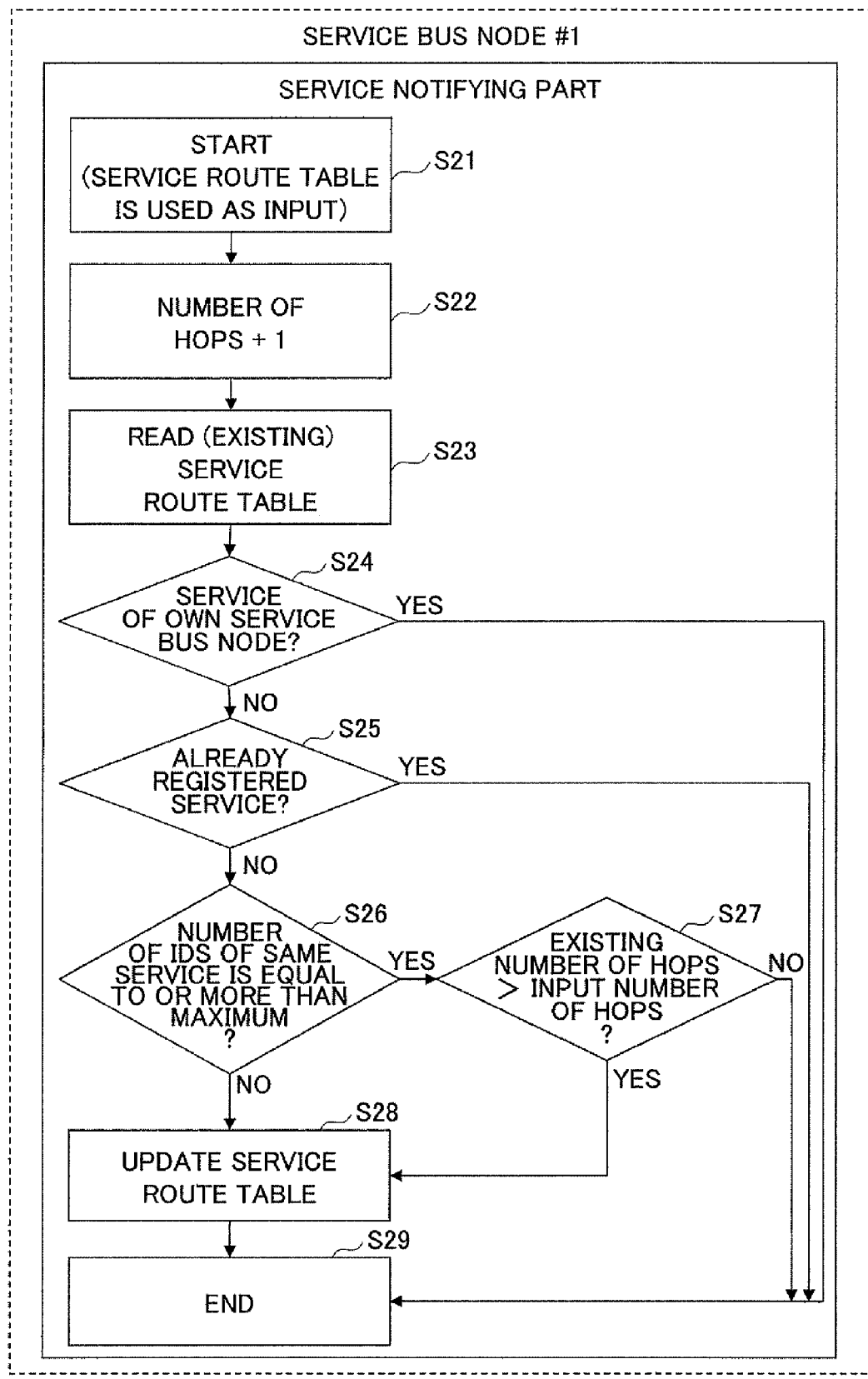
FIG. 7 depicts a flow chart of service route table updating processing.

FIG. 7 depicts a flow chart of service route table updating processing. First, the service route table 46 is received from the adjacent service bus 40 in step S21. The service route table 46 received from the adjacent service bus 40 has, as depicted in FIG. 8A, such a form that a plurality of service IDs and a plurality of the numbers of hops are written.

The service bus 30 carries out calculation of adding 1 to each of all the numbers of hops in step S22, and obtains values depicted in FIG. 8B. Then, the service route table 36 of the service bus 30 is read in step S23, and comparison and determination is carried out. Then, the service route table 36 of the service bus 30 is updated.

In a case of initial adjacent node registration, nothing has been registered in the service route table 36 of the service bus 30 yet. Therefore, the service bus 30 merely writes received information to the service route table 36. However, when the service route table 36 has been already set in the service bus 30, the service route table 36 is rewritten according to a determination logic.

The determination logic is such that, first, it is determined whether the same service is connected to the own service bus 30 in step S24. In a case of the service route table 36 of the service bus 30 depicted in FIG. 8C, rewriting is therefore not carried out for service ID=A of node ID is "#1" since service ID=A has the number of hops of 0 and thus as depicted in FIG. 8C, is connected to the own service bus 30 (YES in step S24).

Next, it is determined whether the same service has been already registered in step S25. The response from the service bus 40 is processed now, and thus, a corresponding record of node ID="#2" is noted. It is seen from FIG. 8C that service B has been already registered for the node ID of #2 with the number of hops of 2. For such a service, updating is not carried out (YES in step S25).

Next, for the existing service route table 36 of the service bus 30 depicted in FIG. 8C, an upper limit is provided for how many same service IDs can be registered, for the purpose of preventing the same service IDs registered from increasing infinitely (step S26). It is assumed that the upper limit is 2.

In FIG. 8C, as to service ID=C, only one record has been registered (1<2, and thus, NO in step S26). Therefore, service ID=C written in FIG. 8B is additionally registered (step S28). Further, as to service ID=D, in the existing service route table 36 of the service bus 30 of FIG. 8C, service ID=D has been registered in node ID=#3 with the number of hops of 1, and in node ID=#4 with the number of hops of 3. As mentioned above, the upper limit (maximum) of service ID registration is 2. Therefore, $2 \geq 2$, and thus, YES in step S26.

In this case, the existing number of hops for D and the input number of hops for D are compared in step S27. Then, when the input number of hops for D is smaller (YES in step S27), overwriting updating is carried out in step S28. The input number of hops for the service ID "D" is 2 as depicted in FIG. 8B, which is smaller than the number of hops of 3 of node ID=#4 in the existing service route table 36 of the service node 30 depicted in FIG. 8C. Therefore, this record is overwritten.

On the other hand, as to service ID=F in FIG. 8C, two records have been registered, which number two coincides with the upper limit two for the same service IDs (YES in step S26), same as service ID=D. Then, in comparison to the number of hops of 4 for "F" in FIG. 8B, the number of hops is 1 for node ID=#3 and the number of hops is 2 for node ID=#4 in the existing service route table 36 of the service bus 30 of FIG. 8C. Thus, the number of hops in FIG. 8B is larger than each in FIG. 8C (1<4, 2<4, and thus, NO in step S27). Therefore, updating of the existing service route table 36 of the service bus 30 is not carried out.

As to records of the existing service route table 36 of the service bus 30 of FIG. 8C, which are to be updated as mentioned above, records of the node ID "#2" which is of the adjacent node 40 are used. Consequently, the existing service route table of FIG. 8C is rewritten into the updated service route table 36 of the service bus 30 of FIG. 8D.

Returning to FIG. 6, when updating processing for the service route table 36 of the service bus 30 is thus finished, the bus node table is read. Then, when there are no other adjacent nodes than the service node 40 currently processed (NO in step S13), the processing is finished in step S13.

When there are other adjacent nodes than the service bus 30 currently processed (YES in step S13), the records of the service route table 36 which have been thus updated currently are transmitted to each of all the other adjacent nodes than the service bus 40 in step S14. In the example of FIG. 8D, total 3 records have been updated, and thus, these 3 records are transmitted. The processing of transmitting the updated records of the service route table 36 will be described later for next "service registration" in detail.

<Service Registration>

FIG. 9 depicts an outline of operation of service registration. When a service and an application are communicated together with the use of a service bus, each of the service and the application carry out service registration with the service bus.

When the service 48 carries out service registration, a service ID, a position (IP address) of a server in which the service 48 operates, a service type (starting-up type, reading type or application), a protocol, input parameters and output parameters are registered with the service bus 40 (or 30) as data.

When the application 38 carries out service registration, a service ID, a position (IP address) of a server in which the service 38 operates, a service type (for example, application) and a protocol are registered with the service bus 30 (or 40) as data.

Below, a case of service registration with the service bus 30 will be described. The order receiving part 31 of the service bus 30 receives a service registration request, reads a service entry table 32*a* of the endpoint data 32, confirms that the own service bus does not have a service for which registration is thus requested, and transfers the processing to the service notifying part 37.

The service notifying part 37 then carries out updating of the endpoint data 32, reads the bus node table 35 and the service route table 36, and notifies the service bus 40 of the thus-registered service.

The endpoint data 32 has the service entry table 32*a*, an input parameter table 32*b* and an output parameter table 32*c*. The service entry table 32*a* stores information indicating what service is registered with the own service bus. The service entry table 32*a* stores a service ID received at a time of service registration, a position (IP address) at which the service operates, a service type and a protocol, as a record for each of services and applications.

The input parameter table 32*b* stores parameters which are used for accessing a service. The input parameter table 32*b* stores a service ID received at a time of service registration, a parameter name, a parameter type, and a validity value for each of all the input parameters.

The output parameter table 32*c* stores parameters which are returned to a request source when a service is accessed and the service carries out processing. The output parameter table 32*c* stores data the same as that of the input parameter table 32*b*.

Figure 10:
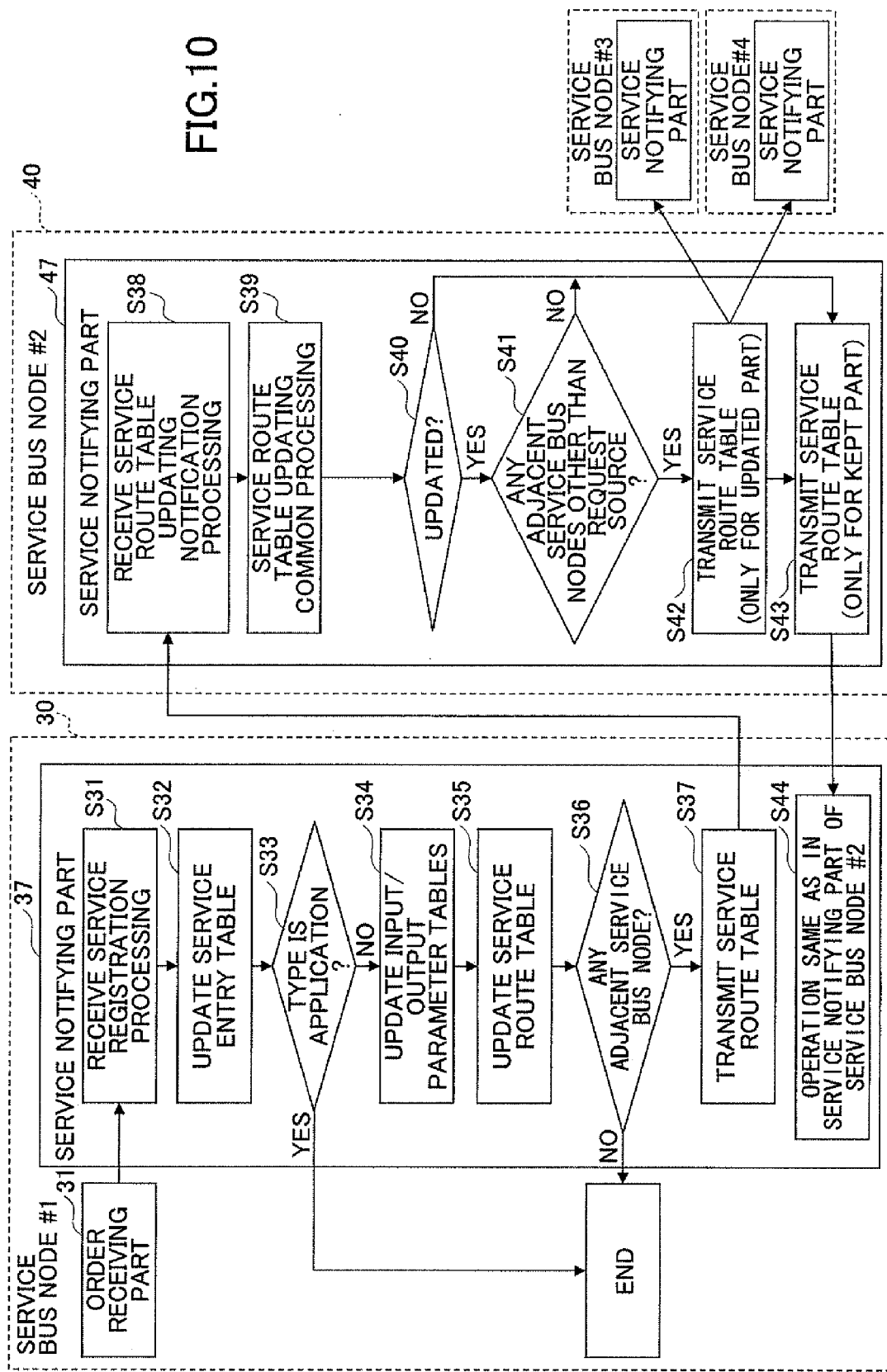
FIG. 10 depicts a flow chart of service registration processing.

FIG. 10 depicts a flow chart for service registration processing. The order receiving part 31 transfers, to the service notifying part 37, data received from the service at a time of service registration (i.e., service ID, IP address which is a position of a server at which the service operates, service type, protocol, input parameters and output parameters) in step S31. First, from the thus-transferred data, the service ID, position, type and protocol are extracted, and are written in the service entry table 32*a* in step S32.

Next, when the type is "application" (YES in step S33), the processing is finished. Otherwise (NO in step S33), that is, in a case of a "starting-up type" service or a "reading type" service, the input parameters and the output parameters are then extracted from the transferred data, and are written in the input parameter table 32*b* and the output parameter table 32*c*, respectively in step S34.

Next, the service route table 36 is updated in step S35. The service route table 36 has, as elements, node ID, service ID and the number of hops. In this case where the service is connected to the own node 30, ID of the own node is set as node ID, the registered service ID is set as service ID and "0" is set as the number of hops, and thus, a record is added to the service route table 36.

When no adjacent node exits (NO in step S36), the processing is finished. However, there are any adjacent nodes (YES in step S36), the service route table updating is notified of to all the adjacent nodes. For this purpose, the node ID of the own node (request source) and the service IDs and the numbers of hops of the added services (updated part) are notified of, in step S37.

When receiving the service route table updating notification in step S38, the adjacent service bus 40 carries out updating of the service route table 46 in step S39, according to the flow chart for service route table updating processing depicted in FIG. 7.

When actually no updating has been carried out in the service bus 40 (NO in step S40), the service bus 40 returns, to the service bus 30, such part of the service route table 46 (service IDs and the numbers of hops) that are kept unchanged (referred to as "kept part"), together with the node ID "#2" of the own node in step S43. The information thus transmitted may be used for determining which node is accessed when an application accesses a service of a remote service bus. Details will be described later for a description of "service accessing".

On the other hand, when the service route table 46 has been updated in the service bus 40 (YES in step S40), it is determined whether there are any further adjacent nodes of the service bus 40 in step S41. When any further adjacent nodes exist (YES in step S41), service route table updating is notified of in step S42. For this purpose, node ID of the own node (request source), and service IDs and the numbers of hops of the currently updated services (referred to as "updated part") of the service route table 46 are transmitted to each of the further adjacent nodes of the service bus 40 in step S42. The information notified of at this time includes items the same as those notified of from the service bus 30 to the service bus 40. However, in this case, the request source node ID is of the own service bus 40, and each of the numbers of hops is incremented by one. It is noted that, in order to avoid infinite circulation, notification is not carried out to the service bus 30 which is the request source as an exception. In the case of FIG. 10, notification is carried out only to the node "#3" and the node "#4", not to the node "#1" (i.e., the service bus 30).

Also the node "#3" and the node "#4" carry out processing the same as that of the service bus 40. Through repetition of such operation, the information that the service has been newly added can be notified of throughout the communication network.

After service route table updating notification to the adjacent nodes "#3" and "#4" is thus completed, the service bus 40 transmits all of such records (referred to kept part as mentioned above) of the service route table 36, which have not been updated currently, to the service bus 30 in step S43. When the service bus 30 receives this response, service route table updating the same as that carried out in the service bus 40 is carried out in the service bus 30 in step S44.

<Service Accessing>

In order that an application accesses a service via a service bus, the application and the service previously carry out service registration with the service bus. Further, in order to establish which service bus the service is connected and what access route through which the application communicates with the service, the application carries out steps of sending an access starting request, establishing the access route and then, carrying out actual accessing.

Figure 11:
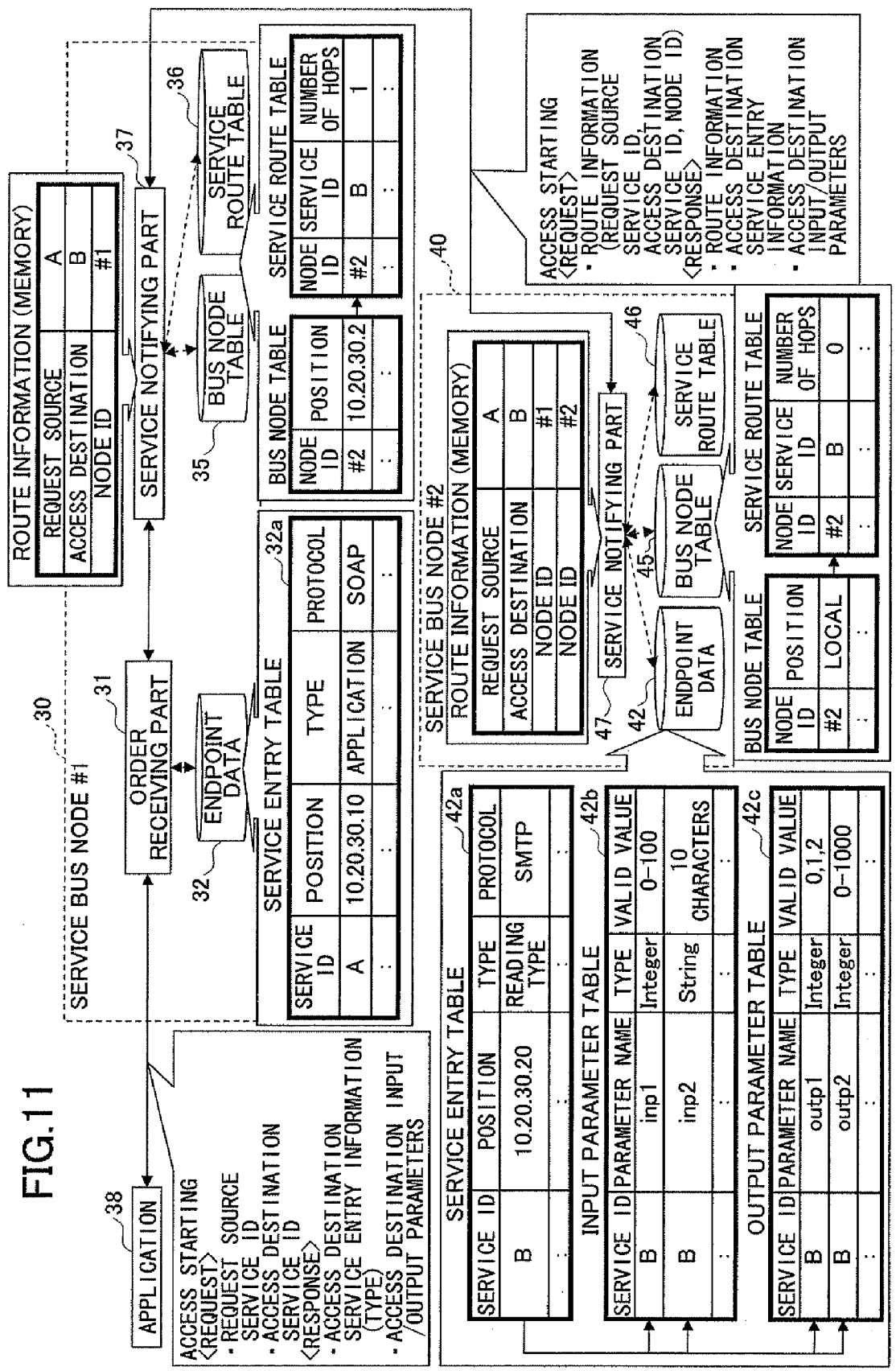
FIG. 11 depicts an outline of access starting operation.

FIG. 11 depicts an outline of access starting operation to carry out route establishment for an application accessing a service.

The application 38 sends an access starting request to the service bus 30. At this time, the application 38 notifies of a request source service ID and an access destination service ID. The order receiving part 31 receives the request, and determines, from the received request source service ID and the service entry table 32a which the service bus has, whether the service (i.e., the application 38) has been registered in the service bus 30. When the application 38 has not been registered in the service bus 30 yet, the request is not actually received.

When the application 38 has been registered in the service bus 30, an access starting notification is sent to the service notifying part 37, the service notifying part 37 then carries out communication with a service notifying part of another node, for example, the service notifying part 47 of the service bus 40, and establishes an access route. Details will be described later.

When establishment of the access route is thus completed, the memory 37a of the service notifying part 37 has corresponding route information. The route information includes, as elements, a plurality of node IDs in such a manner that node IDs are written in sequence through which communication is carried out in the sequence, with the request source service ID and the access destination service ID as keys.

Figure 12:
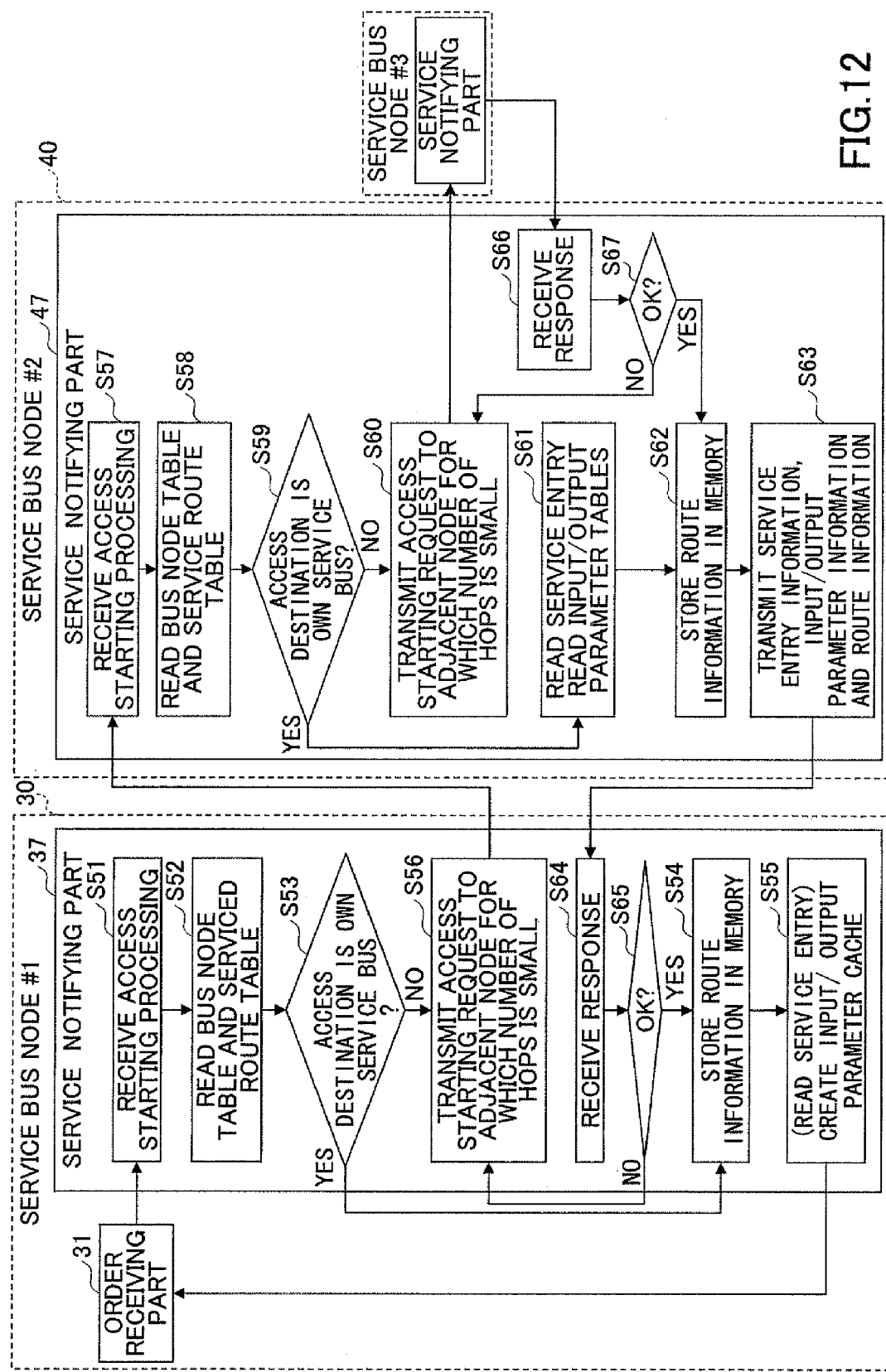
FIG. 12 depicts a flow chart of access starting processing.

FIG. 12 depicts a flow chart of access starting processing. The order receiving part 31 receives an access starting request from the application 38 connected to the service bus 30, and the service notifying part 37 carries out access starting processing in step S51.

First, the service route table 36 is read in step S52, and it is determined whether the access destination service ID identifies a service which is connected to the own node in step S53. This determination is as to whether the service is registered with the number of hops of 0. When the access destination service ID identifies another service bus, a position (IP address) of this other service bus is obtained as a result of a node ID being first obtained from the service route table 36, and, with the thus-obtained node ID as a key, an IP address of the service being obtained from the bus node table 35.

When the access destination is the own node (YES in step S53), the own node is written as node ID of the route information, and the route information is stored in the memory 37a in step S54. Further, the service entry table 32a is read, and a position, type and protocol of the access destination service are obtained. The input parameter table 32b and the output parameter table 32c are also read, and input/output information of the access destination service is obtained. The thus-obtained information is stored in the memory 37a of the service notifying part 37 (i.e., cache creation) in step S55.

As a result of the information being thus stored in the memory 37a, actual access carrying-out operation can be carried out at high speed without accessing a database. After step S55 has been thus carried out, a processing result is returned to the order receiving part 31. Then, access starting processing for the service registered with the own node is finished.

On the other hand, when the access destination is of another node (NO in step S53), the service route table 36 is read, and first, an access starting request is sent to a node which the number of hops is smallest to reach (in an example of FIGS. 11 and 12, the service bus 40), in step S56. At a time of this access starting request to the other node, the route information is notified of. The route information has the request source service ID (A), the access destination service ID (B) and, at a time of the first transmission to the adjacent node, only node ID=#1 of the own node, set therein.

When the service notifying part 47 of the service bus 40 then receives the access starting request in step S57, the service route table 46 is read, same as in the service bus 30, in step S58, and it is determined whether the destination service is connected to the own service bus 40 in step S59.

When the service is connected to another node (NO in step S59), an access stating request is sent to a node ID=#3 which is reached by the smallest number of hops, together with the route information initially, same as the service bus 30, in step S60. In the route information, "#1" and "#2" are set as node IDs.

On the other hand, when it is determined that the service is connected to the own node (YES in step S59), the service entry table is read, and service entry information (a position, a type and a protocol of the access destination service) is obtained, same as the service bus 30 in the case where the service is connected to the own node. The input parameter table and the output parameter table are read, and input/output information of the access destination service is also obtained, in step S61. Then the route information is stored in the memory 47a, in step S62.

Different from a case where the service connected to the own node is registered in the service bus 30, "#1" and "#2" are written as node IDs of the route information. Then, the thus-obtained service entry information, the input/output information, and the route information are transmitted to the service bus 30 of the node ID=#1 which is the request source included in the route information, in step S63.

When the service bus 30 receives this response information in step S64, it is determined whether processing has been properly finished in step S65. When the processing has not been properly finished (NO in step S65), an access starting request is sent to another adjacent node which can be reached with the next to the smallest number of hops in step S56, and processing the same as that described above for the service bus 40 is carried out for this other adjacent node.

When the processing has been finished properly (YES in step S65), the route information received from the service bus 40 is written in the memory 37a in step S54, same as in the case where the service is connected to the own node. Also, a cache of the input/output information received from the service bus 40 is created in step S55. Then, a processing result is returned to the order receiving part 31.

When the service bus 40 receives a response from the node "#3" in step S66, the service bus 40 determines whether processing has been properly finished in step S67, same as the service bus 30. When the processing has not been finished properly (NO in step S67), processing is proceeded with to step S60. When the processing has been finished properly (YES in step S67), processing is proceeded with to step S62.

It is noted that, the order receiving part 13 returns a response to the application 38. At this time, a type of an access destination service and input/output parameter information are sent as data of the response. Thereby, the application 38 can know what parameters are to be provided and what information will be returned as a processing result, when actually accessing the service. Thus, the route from the application through the service via the service bus(s) is established.

Figure 13:
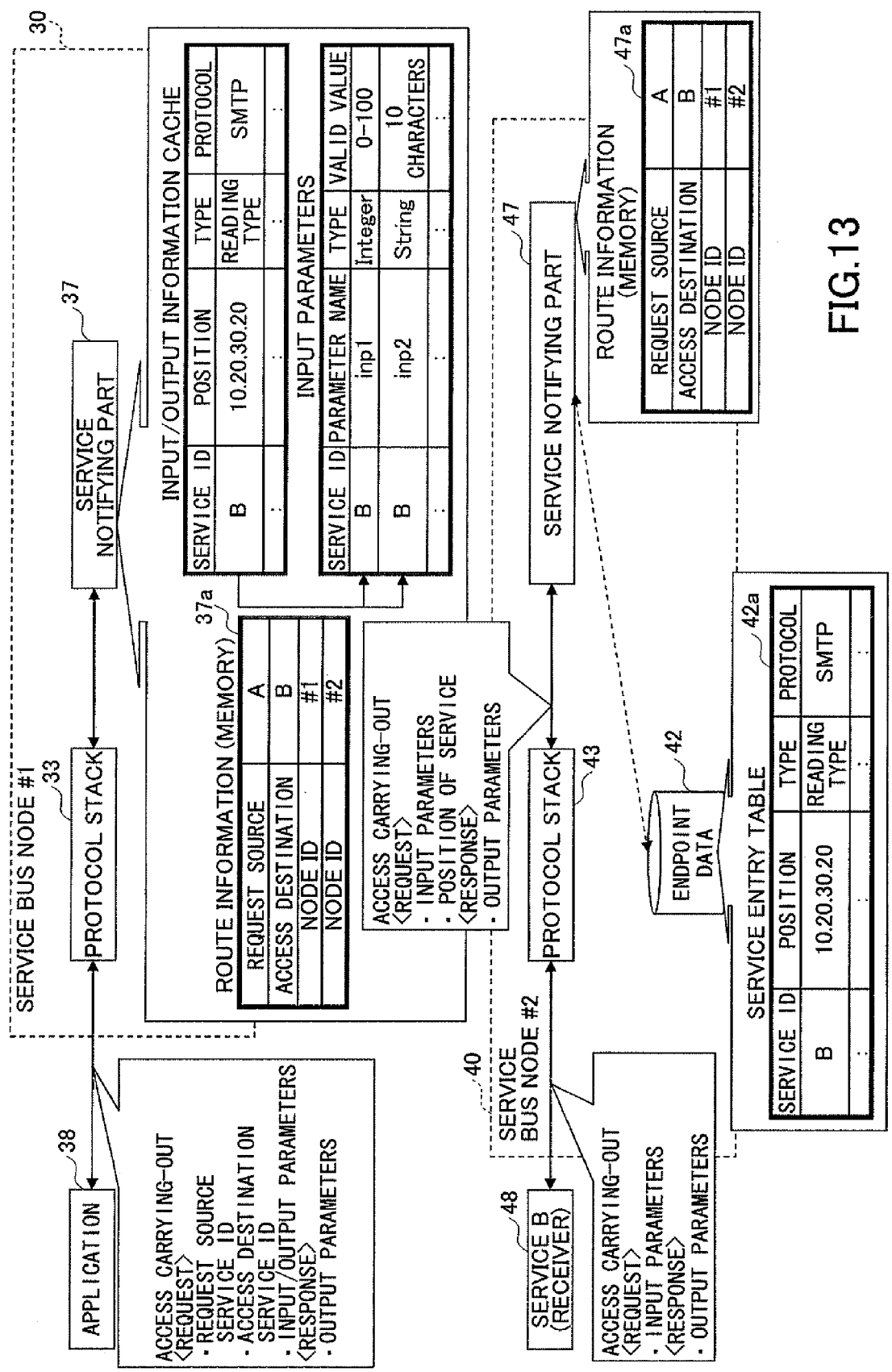
FIG. 13 depicts an outline of access carrying-out operation.

FIG. 13 depicts an outline of access carrying-out operation for an application actually accessing a service after a route has thus been established.

The application 38 carries out an access carrying-out request for a service with a desired protocol to the service bus 30. As a result, the service bus 30 receives the access carrying-out request with a previously prepared protocol stack 33, and transfers an order to the service notifying part 37.

When the application 38 starts accessing, the application 38 provides a request source service ID, an access destination service ID, and input parameters used to inputting to the service. The input parameters can be known from input parameter information included in a response received from the service bus 30 when the application 38 starts accessing.

When the service notifying part 37 of the service bus 30 receives the access carrying-out request, the service notifying part 37 dispatches the access carrying out request to a service bus (for example, the service bus 40) to which the destination service 48 is connected, via one or a plurality of service buses 30 (or 30 and 40), with reading the route information from the memory 37a.

When the service bus notifying part 47 of the service bus 40 receives the access carrying-out request, the service notifying part 47 reads the service entry table 42a, and dispatches the order to a server in which the service 48 operates, by requesting the protocol stack 43 to do so, which the access destination service 48 uses, with reading the service entry table 42a.

Figure 14:
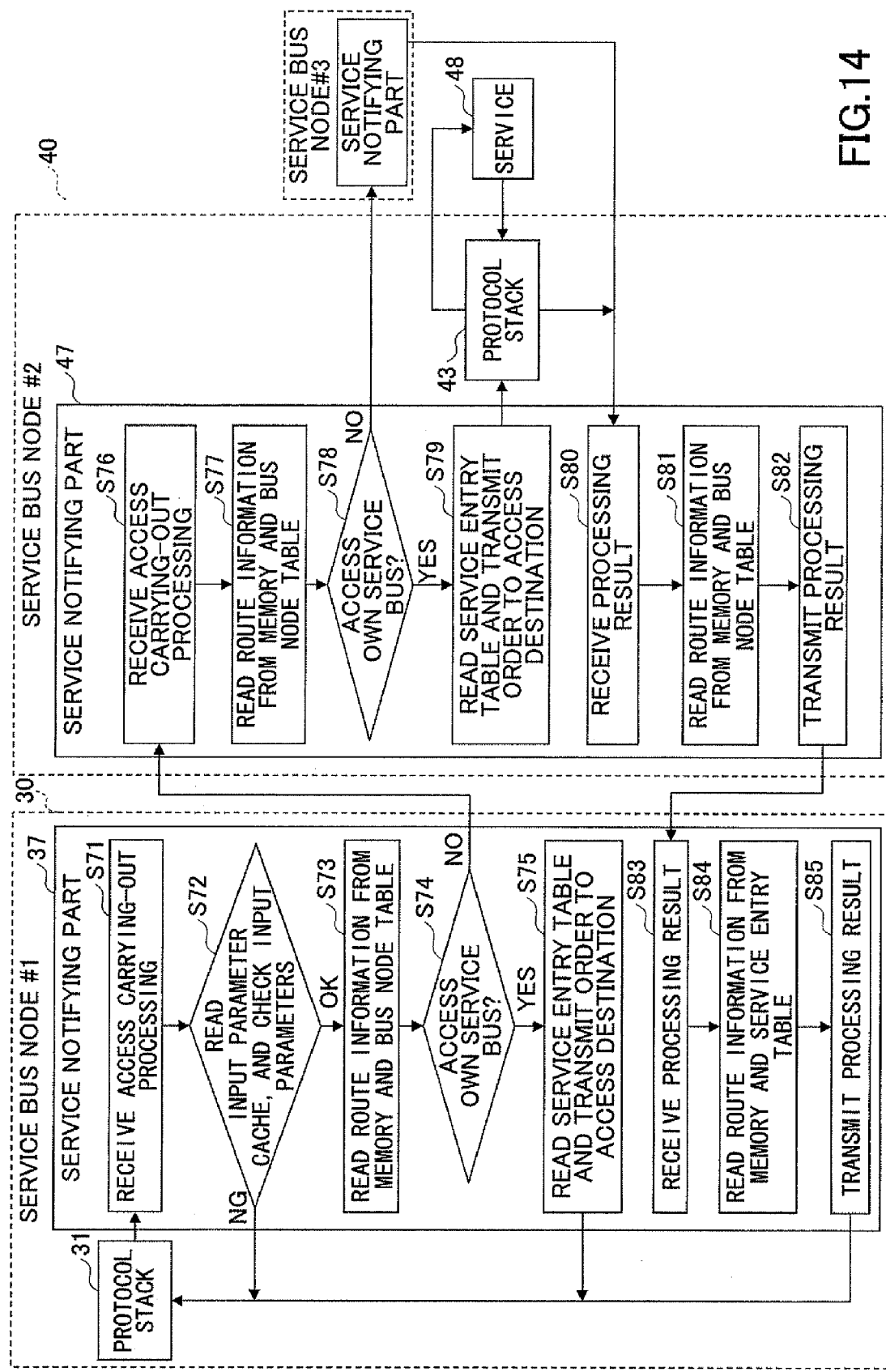
FIG. 14 depicts a flow chart of access carrying-out processing.

FIG. 14 depicts a flow chart of access carrying-out processing. When the service notifying part 37 receives the access carrying-out request from the protocol stack 33 which receives the order from the application 38 in step S71, the service notifying part 37 compares the input parameters received from the application 38 with the input parameter information cache in the service notifying part 37 in step S72. When the input parameters are invalid (NG in step S72), the request is not actually received. The reason why the input parameters are thus checked is to prevent an invalid order from circulating between the service buses 30 and 40, which may increase a network load.

Next, with the use of the request source service ID and the access destination service ID received from the application 38, the route information is read from the memory 37a of the service notifying part 37, and the route (i.e., corresponding node IDs) for the access destination is obtained. Simultaneously, the bus node table 35 is read, and positions (IP addresses) of node IDs of adjacent nodes are obtained in step S73.

When the access destination is a service connected to the own service bus 30 (YES in step S74), the position (IP address), type and protocol of the access destination service, registered in the service entry table 32a, are read. Then, together with the input parameters and the position designated by the application 38, a request is sent to the protocol stack 33 of the protocol thus read from the service entry table 32a. As a result, the protocol stack 33 accesses the destination service together with the input parameters in step S75.

On the other hand, when the access destination service is connected to another node (NO in step S74), the route information is read, and an access carrying-out request is transmitted to the next service bus 40. Data transmitted at this time includes the request source service ID, the access destination service ID and the input parameters designated by the application 38.

When the service notifying part 47 of the next service bus 40 receives the access carrying-out request in step S76, the service notifying part 47 determines, same as in the case of the service bus 30, from the route information of the memory 47a, and the received request source service ID and the access designation service ID, whether the access destination is connected to the own node 40, or is connected to another node, in steps S77 and S78.

When the access destination is connected to another node (NO in step S78), an access carrying-out request is transmitted to a further next node "#3", same as the service bus 30. When the access destination is connected to the own service bus 40 (YES in step S78), processing is carried out, same as the case where the access destination is connected to the own node in the service bus 30, in step S79. Thus, a request is sent to the protocol stack 43, and a processing result response is received from the service 48 in step S80.

The processing result response is transmitted to the service bus 30 which is the request source in step S82, after the route information is read again in step S81, through the same route as that used when the request has been sent, in a reverse direction at this time.

The processing result response includes information designated in the output parameters. Then, when the processing result response is returned to the service bus 30 in step S83 to which the application 38 is connected, the service entry table 32a is read in step S84, a request is sent to the protocol stack 33 which the application 38 uses, in step S85. Thus, the response including the output information (processing result) is returned to the application 38.

Thus, the application 38 accesses the service 48 via the plurality of service buses 30 and 40.

<Linking of a Plurality of Service Buses>

Figure 15:
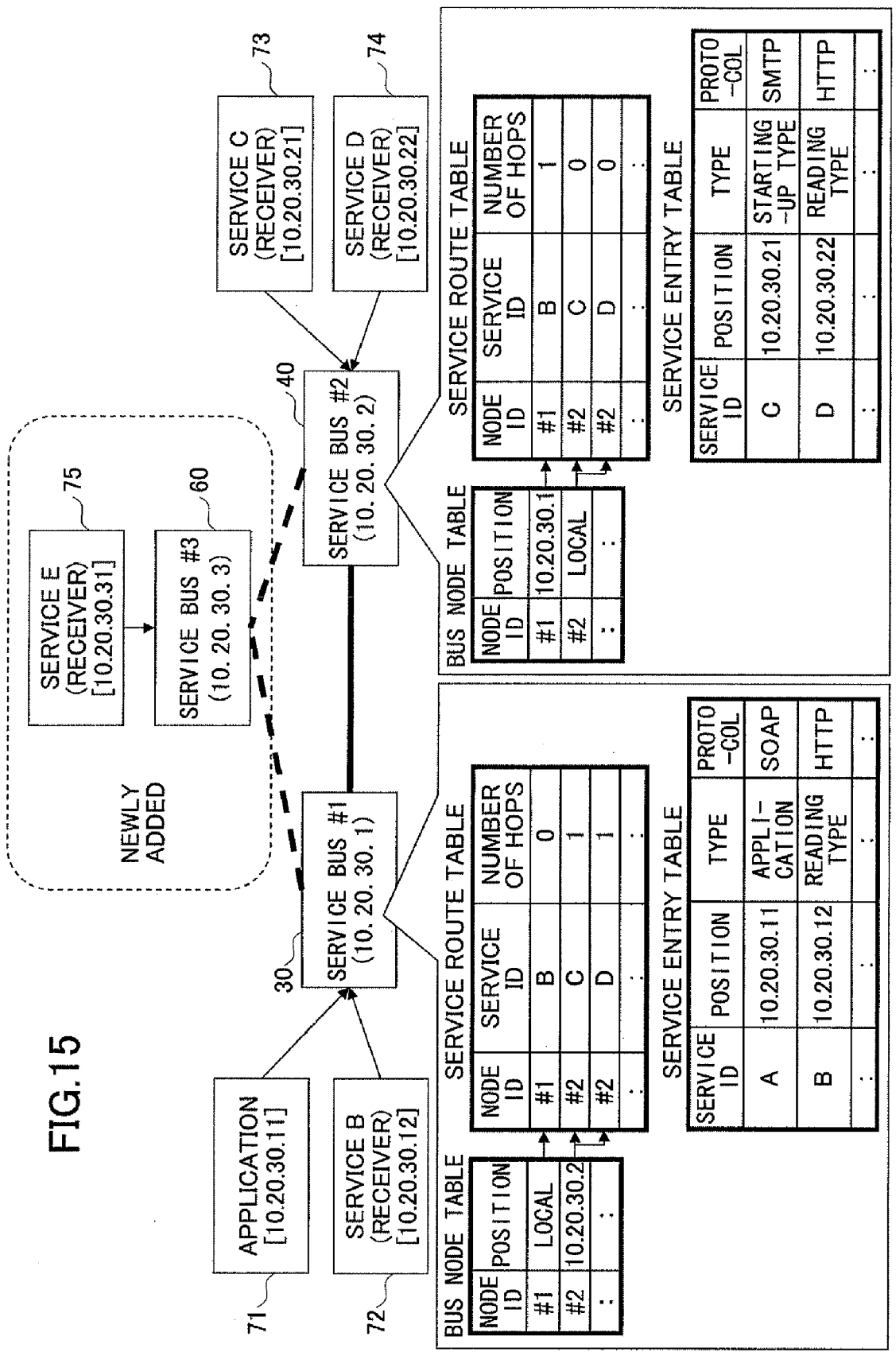
FIG. 15 depicts one embodiment in which a plurality of service buses are linked together.

FIG. 15 depicts an embodiment in which a plurality of service buses are linked together. In the embodiment, a service bus 30 of node ID=#1 and a service bus 40 of node ID=#2 are already connected together. To the service bus 30, an application 71 of service ID=A and a service 72 of service ID=B are connected. To the service bus 40, a service 73 of service ID=C and a service 74 of service ID=D are connected.

To this configuration, a service bus 60 of node ID=#3 is newly connected. Further, to the service bus 60, a service 75 of service ID=E is connected. Then, the application 71 is to access the service 73.

The service buses 30 and 40 are already connected together, and thus, as depicted in FIG. 15, bus node tables 35, 45, service route tables 36, 46, and service entry tables 32a, 42a are already created.

<Registration of Service Bus>

Description will now be made for a case where the service bus 60 is newly set, and setting is carried out for connecting the service bus 60 to the service bus 30 and the service bus 40, with reference to FIGS. 16, 17A and 17B.

FIG. 16 depicts a sequence for connecting the additional service bus 60 to the existing service bus 30. The sequence starts from a state where service bus registration of the own service bus 60 has been already completed, and the service bus 30 is to be added in the service bus 60.

When the service bus 60 receives a registration request for the service bus 30, a position of the service bus 30 input by a maintenance person is added as a record in a bus node table of the service bus 60 in step S91. Then, a bus node table updating notification is sent to the service bus 30 which is an adjacent node in step S92. At this time, data including request node ID=#3 and request source position (10. 20. 30. 3) of the own node 60 is sent.

When the service bus 30 receives the bus node table updating notification, the service bus 30 adds the received information to the bus node table 35, and sends back the service route table 36 which the service bus 30 has to the service bus 60 in step S93.

The service bus 60 carries out updating processing according to service route table updating processing depicted in FIG. 7. That is, the service bus 60, having a service route table in which nothing has been set yet, writes all the information in the service route table after one is added to each of the received numbers of hops and node ID=#1 is set, in step S94.

Figure 17A:
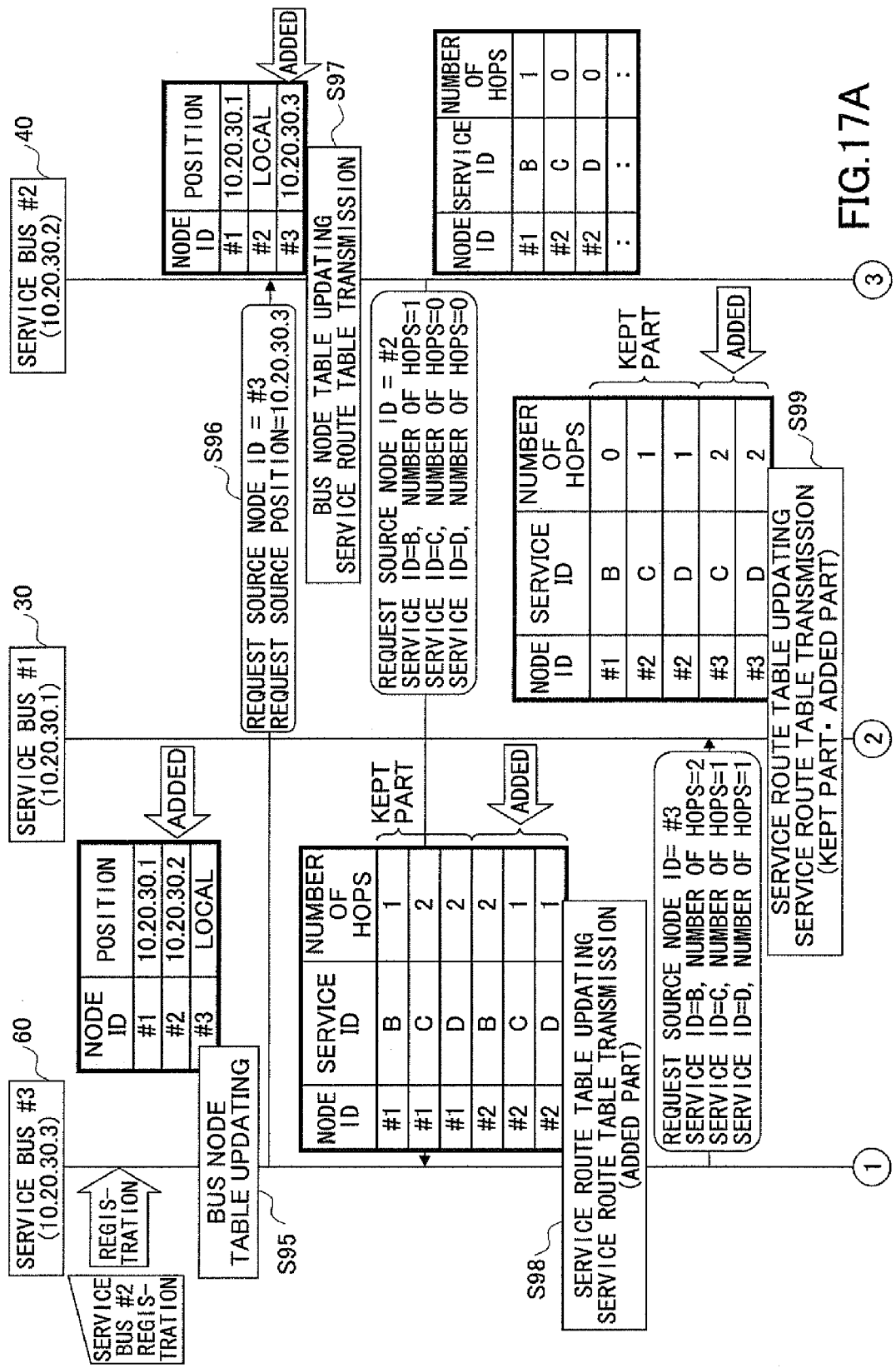

FIGS. 17A and 17B depict a sequence of connecting the additional service bus 60 further to the existing service bus 40. The bus node table is updated in step S95, and a bus node table updating notification is sent to the service bus 40 in step S96. Operation that the service route table 46 of the service bus 40 is transmitted to the service bus 60 in step S97, and the service bus 60 receives the service route table 46, is the same as that when the service bus 30 has been added.

That is, according to the service route table updating processing depicted in FIG. 7, one is added to each of the received numbers of hops in step S22, and then, the service route table which the service bus 60 already has is read in step S23. As to "service of own service bus node?" in step S24 of FIG. 7, a determination result is NO. As to "already registered service?" in step S25, a determination result is NO. As to "existing number of hops >input number of hops" in step S27, a determination result for the service 72 (B) is NO. However, as to "the number of IDs of same service is equal to or more than maximum?" in step S26, a determination result is NO. It is noted that "maximum" in step S26 is set as 2. As a result, all the records are additionally written in the service route table in step S28.

From here, a situation is different from that when the service bus 30 has been added. As to "any other service bus node?" in step S13 of FIG. 6, a determination result is YES because the service bus 30 exists. As a result, the service route table to which the records have been currently added is transmitted to the service bus 30 in step S14 of FIG. 6 and step S98 of FIG. 17A as a service route table updating notification.

When the service bus 30 receives the service route table updating notification, the service bus 30 updates the service route table 36 according to service registering processing depicted in FIG. 10 in step S99. The updating is carried out according to service route table updating processing depicted in FIG. 7. In this case, service ID=B is a service which is connected to the own node in the service bus 30. Therefore, service ID=B is not added. The other service ID=C and service ID=D are added to the service route table 36 of the service bus 30 because the updating requirement is met, after one is added to each of the received numbers of hops.

Accordingly, in step S40 of FIG. 10, a determination "updated?" has a result of YES. Further, a determination "any adjacent service bus nodes other than request source?" in step S41 has a result of YES because the service node 40 exists.

Therefore, the records having been currently added to the service route table 36 of the service bus are transmitted to the service bus 40. Then, same as the service bus 30, the service bus 40 carries out updating of the service route table 46.

Further, as a response from the service bus 30 to the service bus 60, such records of the service route table 36 of the service bus 30 which have not been currently updated (i.e., kept part) are transmitted in step S99. The kept part of the service bus 30 includes service ID=B with the number of hops of 0, service ID=C with the number of hops of 1 and service ID=D with the number of hops of 1.

The service bus 60 adds one to each of these numbers of hops, and compares with those of the existing service route table. In this case, those already registered are coincident with the corresponding ones. Therefore, a determination "already registered service" in step S25 of FIG. 7 has a result of YES. As a result, no updating is carried out. Further, further sending of a service route table updating notification to an adjacent node from the service bus 30 is not carried out. Thus, "transmit service route table (only for updated part)" in step S42 of FIG. 10 is finished in step S100.

Next, the service bus 60 sends back the service route table (only for the kept part) to the service bus 40 in step S101. The kept part in the service bus 60 includes service ID=B with the number of hops of 1, service ID=C with the number of hops of 2 and service ID=D with the number of hops of 2.

When the service bus 40 receives the kept part of the service route table of the service bus 60, since the services 73 (C) and 74 (D) are connected to the own node in the service bus 40, adding is not carried out therefor. Only service ID=B with the number of hops of 1 is added after one is added to the number of hops, in the service bus 40. Same as the service bus 60, the service bus 40 sends back the kept part to the service bus 60. However, since the thus-sent back kept part includes the contents which have already been registered in the service bus 60, actually no updating is carried out in service bus 60 in step S102.

The above-mentioned operation is repeated, and thereby, all the service buses can autonomously grasp where any service exists.

<Service Registration>

Figure 18A:
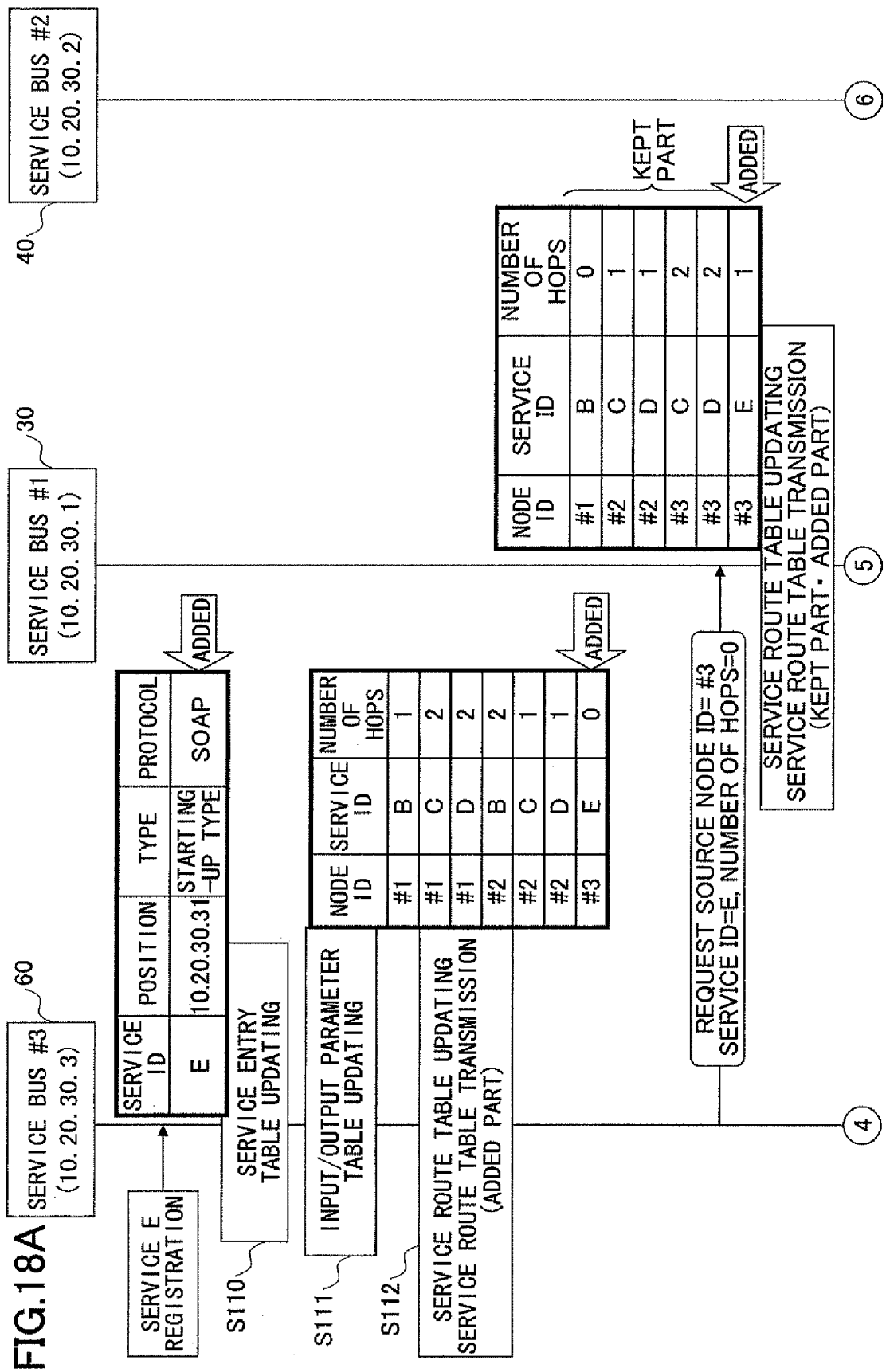

FIGS. 18A and 18B depict a sequence for registering the service 75 with the service bus 60. When the service bus 60 receives a service adding order from a server which provides the service 75, information of service E (75) is added in step S110 according to service registering processing depicted in FIG. 10. A type of the service E is a starting-up type, and therefore, subsequently, an input parameter table and an output parameter table are updated in step S111.

Further, service ID=E with the number of hops of 0 is additionally registered in the service route table of the service bus 60. Then, in a procedure the same as that of service bus registration, added part of the service route table is transmitted to the adjacent nodes, i.e., the service buses 30 and 40, in step S112.

In the same logic, the service route tables 36 and 46 are updated in the service bus 30 and the service bus 40 by the thus-transmitted added part of the service route table, respectively. Then, from each of the service bus 30 and service bus 40, the kept part is returned to the transmission source. Such operation is repeated, and thereby, the fact that the service E has been added is notified of to all the service buses.

<Access to Service>

Figure 19A:
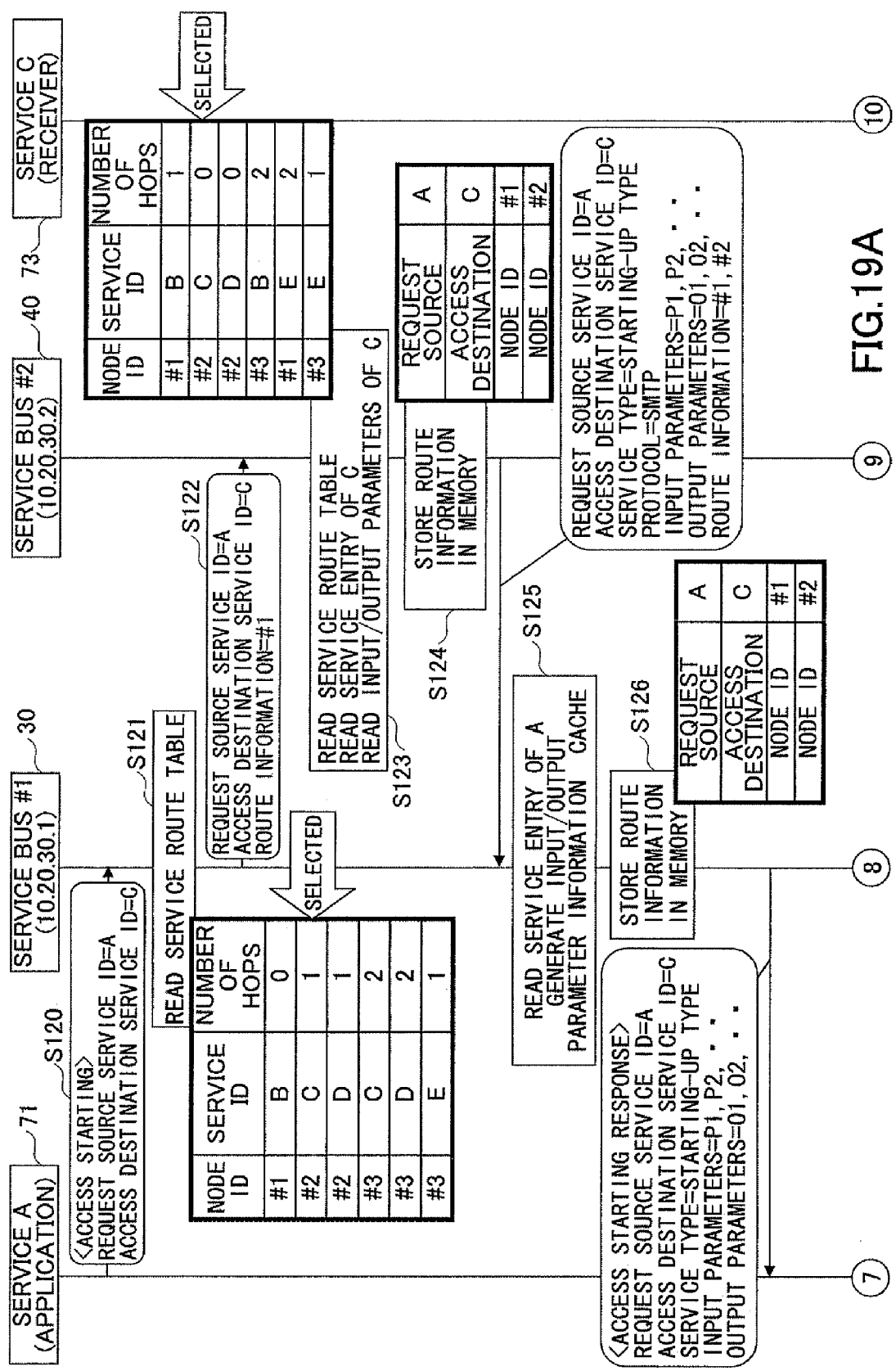
FIGS. 19A and 19B depict a sequence for service accessing.
Figure 19B:
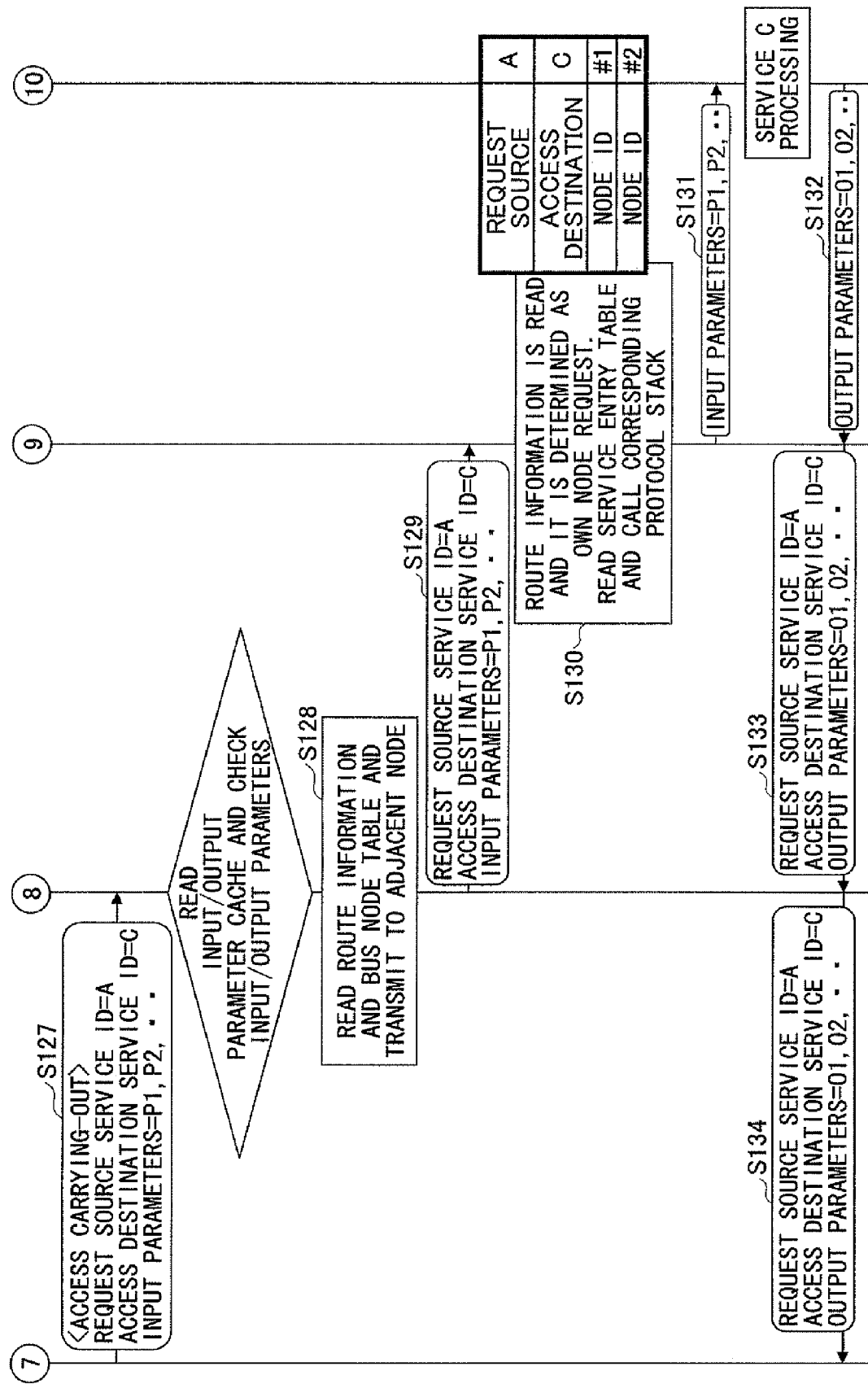

FIGS. 19A and 19B depict a sequence for the application 71 accessing the service 73. First, the application 71 transmits an access starting request to the service bus 30 in step S120. Processing is carried out according to access starting processing depicted in FIG. 12. It is seen that the service 73 is connected to another node in step S121 since the service route table 36 of the service bus 30 does not have any record of the number of hops of 0 for the service 73.

Then, it is determined to access the service bus 40 which can be reached by the number of hops of 1. Then, the service bus 30 transmits an access starting request to the service bus 40 in step S122. Data transmitted at this time includes a request source service ID=A (indicating the application 71), access destination service ID=C (indicating the service 73) and route information=#1 (indicating the service bus 30).

Also in the service bus 40, according to access starting processing depicted in FIG. 12, it is determined that the service 73 is connected to the own node 40, since the service 73 is included in the service route table 46 with the number of hops of 0. Then, the service entry table, the input parameter table and the output parameter table are read, and the information of the service 73 is obtained in step S123.

Then, the own node (the service bus 40) is added to the received route information (only for the service bus 30), and the route information is stored in the memory 47*a* in step S124. Then, the service entry information, the input/output parameter information and the route information are returned to the service bus 30.

In the service bus 30, the received input/output information is stored in the memory 37*a* and a cache is created in step S125. Further, the received route information is stored in the memory 37*a* in step S126. Then, a response is returned to the application 71. When the response is returned to the service A (i.e., the application 71), data is transmitted to the service A, the data including request source service ID=A (application 71), access destination service ID=C (service 73), service type=starting up type (of service 73), input parameter=P1, P2, . . . , and output parameter=O1, O2, . . . .

Next, the application 71 actually carries out accessing the service 73 in step S127. That is, the application 71 sends an access carrying-out request to the service bus 30. Data transmitted to the service bus 30 at this time includes request source service ID=A, access destination service ID=C and input parameter=P1=XX, P2=XX, . . . .

When the service bus 30 receives the access carrying-out request, the service bus 30 compares the received input parameters with the cache of the input parameters, and reads the route information from the memory 37*a*, according to access carrying-out processing depicted in FIG. 14. Then, the service bus 30 sends an access carrying-out request to the adjacent service bus 40 in step S129. Same as the data transmitted from the application 71 to the service bus 30, data transmitted to the service bus 30 at this time includes request source service ID=A, access destination service ID=C and input parameter=P1=XX, P2=XX, . . . .

The service bus 40 reads the route information from the memory, and determines that the received access carrying-out request is for the service 73 connected to the own node 40, according to access carrying-out processing depicted in FIG. 14. Then, the service bus 40 reads the service entry table 42*a*, and transfers, to the protocol stack 43 of SMTP which the service 73 uses, a position (10. 20. 30. 21) of the service 73 and the input parameter=P1=XX, P2=XX, . . . , in step S130.

Then, the protocol stack 43 dispatches the received input parameter=P1=XX, P2=XX, . . . , to the service 73, in step S131. The protocol stack 43 then receives output parameter=O1=XX, O2=XX, . . . , from the service 73, in step S132. Then, the service bus 40 returns a processing response to the service bus 30 which is located in an opposite direction, according to the route information from the memory 47*a* of the service bus 40, in step S133.

The service bus 30, same as the service bus 40, reads the service entry table 32*a*, sends a response request to the protocol stack 33 of SOAP which the application 71 uses, and the protocol stack 33 dispatches the output parameter=O1=XX, O2=XX, . . . to the application 71, in step S134. Thus, the operation of the application 71 accessing the service 73 is completed.

According to a service bus in the above-mentioned reference example, a maintenance person carries out endpoint data registration for each service, and also, endpoint data should be registered for each combination of an application and a service to be connected by the application. This means that, for a service bus to which ten types of services are connected for example, ten times of endpoint data registration are required. Further, for the purpose that ten types of applications are connected, and ten types of services are connected by each of the ten types of applications, 10×10=100, and thus, one hundred times of endpoint data registration are required.

The above-mentioned example is an example in which ten types of applications and ten types of services are used. However, actually, 100 or 1000 types of applications or services may be used. In such a case, such a number of times of maintenance procedure raised to the second power may be required accordingly.

In the above-described embodiment, registration of endpoint data may be carried out by each application or service autonomously. Therefore, a maintenance procedure concerning endpoint registration becomes unnecessary. A maintenance person only carries out service bus node registration, and only carries out registration of an adjacent node to connect. Therefore, without depending on the number of applications or services to use, the maintenance person manages only a network topology (server connecting configuration) of services to manage. Thus, it is possible to reduce a required maintenance procedure, in comparison to the above-mentioned reference example.

Further, in the service bus of the reference example, linking of a plurality of service buses may be difficult in a practical view. Therefore, when the number of applications or the number of services to use increases, and an accessing frequency increases accordingly, a processing capability of a server may be exceeded. Therefore, in the reference example, when preparing a plurality of servers and distributing a processing load thereto, services or applications may have to be divided to groups each including only a few elements.

In the reference example, although such a method is applied, since the number of services which can be included in a single server are limited, it may be necessary to prepare a plurality of servers having different operation modes (i.e., applications, which services to use are limited, are collected), and divide the applications or services.

In the above-described embodiment, a plurality of service buses may be linked together easily. Therefore, when the number of applications or the number of services exceeds an upper limit of a single service bus, another new service bus may be prepared, and new services or applications may be connected only to the new service bus. Thus, adding of new services or applications may be carried out easily. Further, as an advantage of the embodiment in a business view, service buses having been operated by separate business enterprises may be opened to other business enterprises, and services of the respective service buses may be shared accordingly. Thus, the services which could not be accessed by different business enterprises may be accessed by the different business enterprises via existing platforms. If such a configuration is realized, a new business may be created such that charges may be paid among the respective business enterprises.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the sprit and scope of the invention.

What is claimed is:

1. A service bus linking method for linking a plurality of service buses together, comprising:

inputting, to a service bus to be added, a node identifier and a position of an existing service bus to be connected, and registering the node identifier and the position of the existing service bus in a bus node table of the service bus to be added to store node identifiers and positions of the service bus to be added and an adjacent service bus;

sending a bus node table updating notification from the service bus to be added to the existing service bus; and registering, in a bus node table of the existing service bus, the node identifier and the position of the service bus to be added, in response to the bus node table updating notification.

2. A service bus linking method for linking a plurality of service buses together, comprising:

inputting, to a service bus to be added, a node identifier and a position of an existing service bus to be connected, and registering the node identifier and the position of the existing service bus in a bus node table of the service bus to be added to store node identifiers and positions of the service bus to be added and an adjacent service bus;

sending a bus node table updating notification from the service bus to be added to the existing service bus;

registering, in a bus node table of the existing service bus, the node identifier and the position of the service bus to be added, in response to the bus node table updating notification;

reading a service route table of the existing service bus to store a service bus identifier, the service identifier and the number of hops for accessing a service, in response to the bus node table updating notification, and transmitting the service route table to the service bus to be added; and updating a service route table of the service bus to be added, based on the bus node table of the existing service bus, received in the service bus to be added.

3. The service bus linking method as claimed in claim 2, comprising:

inputting in a certain service bus a service identifier, and a position and input/output information of a service to be registered, and registering in end point data of the certain service bus the service identifier, and the position and the input/output information of the service to be registered;

registering in a service route table of the certain service bus a node identifier of the certain service bus, and the service identifier and the number of hops of the service to be registered;

transmitting to an adjacent service bus the service route table of the certain service bus in which the service has been registered;

updating a service route table of the adjacent service bus with the service route table which has been transmitted from the certain service bus;

transmitting the service route table of the adjacent service bus to the certain service bus; and updating the service route table of the certain service bus with the received service route table of the adjacent service bus.

4. The service bus linking method as claimed in claim 2, wherein:

the updating of the service route table is carried out when, for one having the same service identifier, the number of hops of a service route table of one service bus is more than a value obtained from one being added to the number of hops of a service route table received from an adjacent service bus.

5. The service bus linking method as claimed in claim 2, comprising:

inputting from an application an access starting request for a service, and transmitting in sequence between adjacent service buses the access starting request from a service bus to which the application is connected, through a service bus to which the service is connected; and obtaining node identifiers of all the service buses adjacent in sequence from the service bus to which the application is connected through the service bus to which the service is connected, from a response to the service starting request.

6. The service bus linking method as claimed in claim 3, comprising:

transmitting the updated service route table of the adjacent service bus to a further adjacent service bus which is further adjacent to the adjacent service bus.

7. The service bus linking method as claimed in claim 3, comprising:

the certain service bus transmitting an updated part of the service route table of the certain service bus to the adjacent service bus; and the adjacent service bus transmitting the entire service route table of the adjacent service bus to the certain service bus.

8. The service bus linking method as claimed in claim 5, comprising:

obtaining input/output information corresponding to the service from endpoint data stored in the service bus to which the service is connected, and notifying the application of the input/output information as the response to the access starting request.

9. The service bus linking method as claimed in claim 4, wherein:

the updating of a service route table is carried out when the number of records for the same service identifier is equal to or less than a previously set upper limit number.

10. The service bus linking method as claimed in claim 8, comprising:

inputting from the application an access carrying-out request, and transmitting via the service bus to which the application is connected the access carrying-out request to the service bus with the use of route information.

11. A service bus in a service bus system which links a plurality of service buses together, comprising:

a first registering part configured to register a node identifier and a position of an existing service bus to be connected in a bus node table to store node identifiers and positions of the service bus and an adjacent service bus, the node identifier and the position of the existing service bus being input via an external terminal;

an updating notifying part configured to send a bus node table updating notification to the existing service bus; and a second registering part configured to register in a bus node table a node identifier and a position of another adjacent service bus in response to a corresponding bus node table updating notification.

12. A service bus in a service bus system which links a plurality of service buses together, comprising:

a first registering part configured to register a node identifier and a position of an existing service bus to be connected in a bus node table to store node identifiers and positions of the service bus and an adjacent service bus, the node identifier and the position of the existing service bus being input via an external terminal;
an updating notifying part configured to send a bus node table updating notification to the existing service bus; and
a second registering part configured to register in a bus node table a node identifier and a position of another adjacent service bus in response to a corresponding bus node table updating notification;
a first transmitting part configured to read a service route table storing a service bus identifier, and a service identifier and the number of hops for accessing a service, and transmit the service route table to the service bus which has transmitted the bus node table updating notification, in response to the received bus node table updating notification; and
a first updating part configured to update a service route table of the service bus based on a received service route table.

13. The service bus as claimed in claim 12 as a certain service bus, comprising:
a third registering part configured to input a service identifier, and a position and input/output information of a service to be registered in the certain service bus, and register the service identifier, and the position and the input/output information of the service to be registered in endpoint data of the certain service bus;
a fourth registering part configured to register in a service route table of the certain service bus a node identifier of the certain service bus, and the service identifier and the number of hops of the service to be registered; and
a second transmitting part configured to transmit to an adjacent service bus the service route table of the certain service bus in which the service has been registered, wherein:
the adjacent service bus comprises:
a second updating part configured to update a service route table of the adjacent service bus with the service route table which has been transmitted from the certain service bus; and
a third transmitting part configured to transmit to the certain service bus the service route table of the adjacent service bus, and the certain service bus further comprises:
a third updating part configured to update the service route table of the certain service bus with the received service route table of the adjacent service bus.

14. The service bus as claimed in claim 12, wherein:
the first updating part carries out the updating when, for one having the same service identifier, the number of hops of a service route table of one service bus is equal to or more than a value obtained as a result of one being added to the number of hops of a service route table received from an adjacent service bus.

15. The service bus as claimed in claim 13, wherein:
the adjacent service bus comprises:
a fourth transmitting part configured to transmit to another further adjacent service bus which is further adjacent to the adjacent service bus the updated service route table of the adjacent service bus.

16. The service bus as claimed in claim 13, wherein:
the second updating part of the adjacent service bus carries out the updating when, for one having the same service identifier, the number of hops of a service route table of the adjacent service bus is more than a value obtained as a result of one being added to the number of hops of a service route table received from an adjacent service bus.

17. The service bus as claimed in claim 14, wherein:
the first updating part carries out the updating when the number of records for the same service identifier is equal to or less than a previously set upper limit number.

18. The service bus as claimed in claim 15, wherein:
the third transmitting part of the adjacent service bus transmits all of the service route table of the adjacent service bus to the certain service bus; and
the fourth transmitting part of the adjacent service bus transmits an updated part of the service route table of the adjacent service bus to the further adjacent service bus.

19. The service bus as claimed in claim 16, wherein:
the second updating part carries out the updating when the number of records for the same service identifier is equal to or less than a previously set upper limit number.

* * * * *